(12) United States Patent
Oda

(10) Patent No.: US 9,128,366 B2
(45) Date of Patent: Sep. 8, 2015

(54) IMAGE PROCESSING SYSTEM, IMAGE PROCESSING METHOD, AND COMPUTER PROGRAM PRODUCT

(71) Applicant: Miyuki Oda, Shizuoka (JP)

(72) Inventor: Miyuki Oda, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 156 days.

(21) Appl. No.: 13/898,020

(22) Filed: May 20, 2013

(65) Prior Publication Data
US 2013/0314388 A1    Nov. 28, 2013

(30) Foreign Application Priority Data

May 22, 2012  (JP) ................. 2012-116924
Jan. 24, 2013  (JP) ................. 2013-011519
Mar. 7, 2013   (JP) ................. 2013-045728
Mar. 7, 2013   (JP) ................. 2013-045729

(51) Int. Cl.
*H04N 9/31*     (2006.01)
*G03B 21/53*   (2006.01)

(52) U.S. Cl.
CPC ............. *G03B 21/53* (2013.01); *H04N 9/3185* (2013.01); *H04N 9/3194* (2013.01)

(58) Field of Classification Search
CPC ...... G03B 21/00; G03B 21/147; G03B 21/53; H04N 5/74
USPC ................. 345/207, 32, 501, 549, 589, 647; 348/128, 189, 207.99, 745, 746; 353/69, 94; 455/566
See application file for complete search history.

(56) References Cited

U.S. PATENT DOCUMENTS

2007/0070207 A1* 3/2007 Sakurai ................. 348/207.99
2013/0057707 A1  3/2013 Hasegawa

FOREIGN PATENT DOCUMENTS

| JP | 2004-274283 | 9/2004 |
| JP | 2006-033357 | 2/2006 |
| JP | 2013-065277 | 4/2013 |

* cited by examiner

*Primary Examiner* — Dwayne Bost
*Assistant Examiner* — Sepehr Azari
(74) *Attorney, Agent, or Firm* — Cooper & Dunham LLP

(57) ABSTRACT

An image processing system includes a projection unit that projects an image onto a projection surface; a photographing unit to take a photograph of an area including the projection surface onto which a first content image is projected by the projection unit so as to obtain a first photographed image; a data volume reducing unit to reduce a data volume of the first photographed image through a predetermined processing so as to obtain a second photographed image after data volume reduction; a correction information calculating unit to calculate, based on the first content image and the second photographed image, correction information for correcting an image to be projected onto the projection surface; a correction unit to correct, based on the correction information, a second content image that is the image to be projected onto the projection surface. The projection unit projects the corrected second content image onto the projection surface.

15 Claims, 31 Drawing Sheets

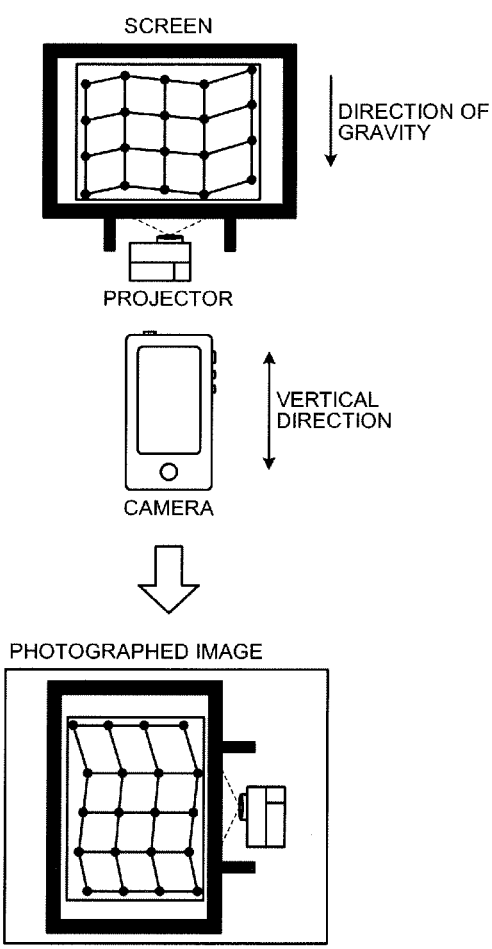

IMAGE PROCESSING SYSTEM, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-116924 filed in Japan on May 22, 2012, Japanese Patent Application No. 2013-011519 filed in Japan on Jan. 24, 2013, Japanese Patent Application No. 2013-045728 filed in Japan on Mar. 7, 2013 and Japanese Patent Application No. 2013-045729 filed in Japan on Mar. 7, 2013.

BACKGROUND OF THE INVENTION

1. Field of the Invention

The present invention relates to an image processing system, an image processing method, and a computer program product.

2. Description of the Related Art

Projectors projecting an image on a screen are known. The image projected from the projector onto the screen usually has a keystone distortion due to the positional relation between the projector and the screen. There are also cases in which a nonlinear distortion appears, reflecting a local undulation or a twist of the screen surface. In particular, when an ultra-short focus projector having a very short focal length is used, slight undulations of the screen can lead to a large distortion of the projection image.

Such a distortion can be corrected by taking a photograph of the screen with a camera to observe the state of the distortion and apply a correction canceling the distortion to the image. With this, an undistorted image can be projected onto the distorted screen.

Japanese Patent Application Laid-open No. 2006-33357 discloses a technique to correct the nonlinear distortion of a projected image occurring due to inclination, distortion, or the like of a screen. This technique involves the use of a camera phone to take a photograph of the screen on which a calibration pattern image constituted by a particular array of figures is projected. Then, an image conversion device calculates a degree of distortion from a difference between an ideal position and an actual extracted position of a feature point extracted from the captured image based on the array of figures, and corrects the image so as to eliminate the calculated distortion. An image without distortion can be displayed on the screen by projecting, from the projector, the image after correction obtained in this manner.

To obtain high accuracy of distortion detection, the photographed image on the screen on which the image is projected is desired to have an appropriate amount of information. However, there is a problem that, when the photographed image contains a large number of pixels or colors, the image has a large data volume so that a large amount of calculation is required to calculate correction information.

Therefore, there is a need for an image processing system and an image processing method that are capable of correcting a distortion of an image projected onto a screen with a small amount of calculation.

SUMMARY OF THE INVENTION

According to an embodiment, there is provided an image processing system that includes a projection unit, a photographing unit, a data volume reducing unit, a correction information calculating unit, and a correction unit. The projection unit projects an image onto a projection surface. The photographing unit takes a photograph of an area including the projection surface onto which a first content image is projected by the projection unit so as to obtain a first photographed image. The data volume reducing unit reduces a data volume of the first photographed image through a predetermined processing so as to obtain a second photographed image after data volume reduction. The correction information calculating unit calculates, based on the first content image and the second photographed image, correction information for correcting an image to be projected onto the projection surface. The correction unit corrects, based on the correction information, a second content image that is the image to be projected onto the projection surface. The projection unit projects the corrected second content image onto the projection surface.

According to another embodiment, there is provided an image processing method that includes projecting an image onto a projection surface; taking a photograph of an area including the projection surface onto which a first content image is projected at the projecting so as to obtain a first photographed image; reducing a data volume of the first photographed image through a predetermined processing so as to obtain a second photographed image after data volume reduction; calculating, based on the first content image and the second photographed image, correction information for correcting an image to be projected onto the projection surface; correcting, based on the correction information, a second content image that is the image to be projected onto the projection surface; and projecting the corrected second content image onto the projection surface.

According to still another embodiment, there is provided a computer program product that includes a non-transitory computer-readable medium containing a computer program. The computer program causes a computer to execute reducing a data volume of a first photographed image through a predetermined processing so as to obtain a second photographed image after data volume reduction, the first photographed image being obtained by taking, by a photographing unit, a photograph of an area including a projection surface onto which a first content image is projected by a projection unit; calculating, based on the first content image and the second photographed image, correction information for correcting an image to be projected onto the projection surface; and correcting, based on the correction information, a second content image that is the image to be projected onto the projection surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22B is a diagram illustrating a photographed image taken while the camera is held with the vertical direction thereof substantially parallel to the direction of gravity;

DETAILED DESCRIPTION OF THE PREFERRED EMBODIMENTS

Embodiments will be described below in detail with reference to the accompanying drawings.

First Embodiment

Figure 1:
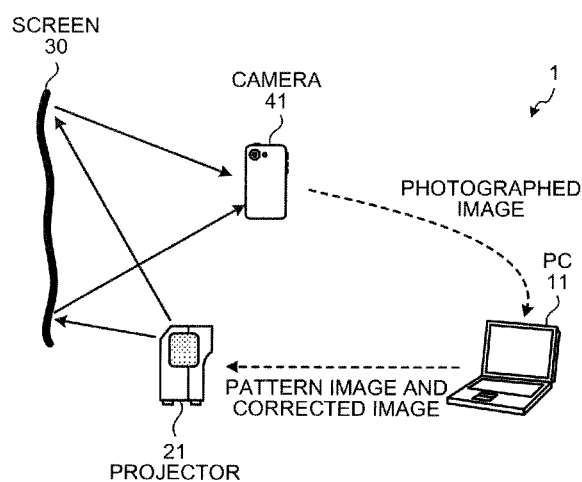
FIG. 1 is a diagram illustrating an overall configuration of an image processing system according to a first embodiment.

FIG. 1 is a diagram illustrating an overall configuration of an image processing system 1 according to a first embodiment. The image processing system 1 is provided with a personal computer (PC) 11, a projector (projection device) 21, and a camera 41. Various types of information are sent and received between the PC 11 and the camera 41, and between the PC 11 and the projector 21.

The PC 11 stores therein information such as content images that are images to be projected onto a screen 30. The projector 21 receives an image to be projected on the screen 30 from the PC 11, and projects the received image.

The camera 41 is, for example, a digital camera, a camera phone, or a smartphone. The camera 41 follows a user operation to take a photograph of an image including the screen 30 with the projected image thereon. In other words, the photographed image taken by the camera 41 includes the projection image displayed on the screen 30.

The projection image projected on the screen 30 has a distortion caused by deflection or the like of the screen 30. The image processing system 1 according to the present embodiment uses the photographed image taken by the camera 41 to calculate correction information for correcting the distortion of the content image projected on the projection surface, and corrects a content image to be projected onto the projection surface based on the correction information. This allows the image processing system 1 according to the present embodiment to project the content image on the screen 30 without producing a distortion.

Note that the communications between the projector 21 and the PC 11, and between the camera 41 and the PC 11 are achieved via a network such as a local area network (LAN). The communications may be either wired or wireless. As another example, each of the communications may be achieved via a communication cable.

Figure 2:
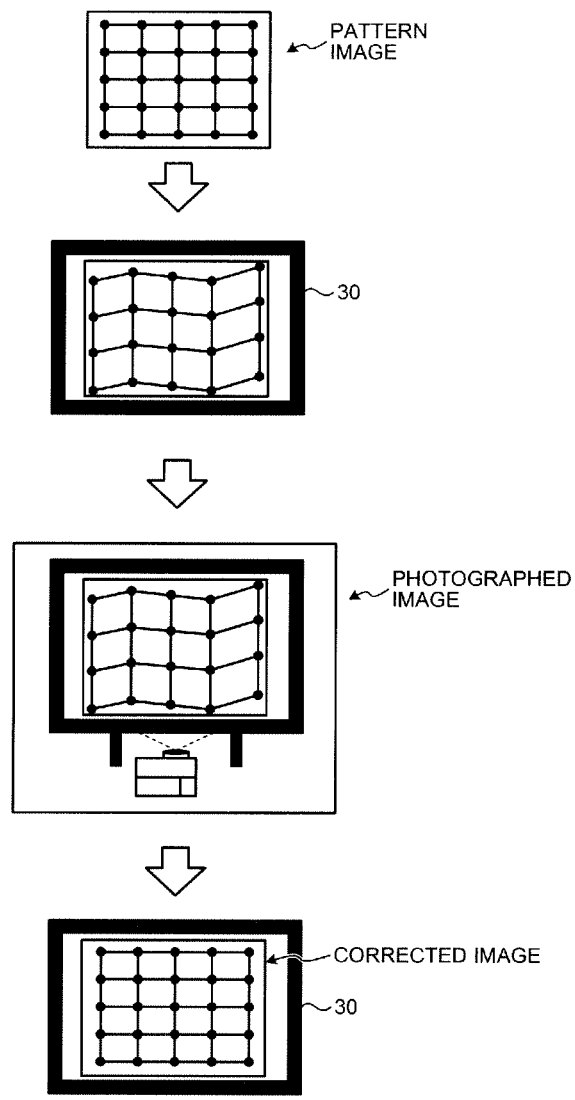
FIG. 2 is a diagram for explaining a distortion correction.

FIG. 2 is a diagram for explaining a distortion correction. The top row of FIG. 2 illustrates a grid-point image as an example of a pattern image prepared for the distortion correction (calibration). As illustrated in the second row of FIG. 2, projecting the pattern image without the distortion correction produces a state in which the grid points of the projection image are distorted by deflection or the like of the screen 30. The same distortion is also produced when the content image is projected.

The image processing system 1 according to the present embodiment takes a photograph of an image including the screen 30 with the pattern image projected thereon to obtain the photographed image as illustrated in the third row of FIG. 2.

Then, based on the photographed image and the pattern image illustrated in the top row of FIG. 2, the PC 11 generates the correction information for correcting the content image to be projected by the projector 21.

The content image to be projected is corrected by using the generated correction information, and the content image after being corrected, that is, the corrected image, is projected onto the screen by the projector 21. The fourth row of FIG. 2 illustrates an example of the corrected image projected on the screen 30. In this manner, projecting the corrected image enables projection of an image without distortion on the screen 30.

In the present embodiment, the pattern image prepared for the distortion correction is used as a correction information generating image that is projected on the screen 30 for generating the correction information. In this case, the correction information is generated from the pattern image serving as the correction information generating image, and the content image to be projected is corrected by using the correction information and projected on the screen 30. In other words, the correction information generating image and the content image to be projected onto the screen 30 are different images.

As another example, the correction information generating image may be the content image to be projected onto the screen 30. In this case, the correction information is generated from the content image to be projected, and the content image is corrected by using the correction information and projected on the screen 30. In other words, the correction information generating image and the content image to be projected onto the screen 30 are the same image.

As described above, the correction information generating image only needs to allow detection of a degree of distortion of the photographed image projected on the screen 30 based on the photographed image taken by the camera 41 and based on the correction information generating image, and thus is not limited to a particular kind.

Figure 3:
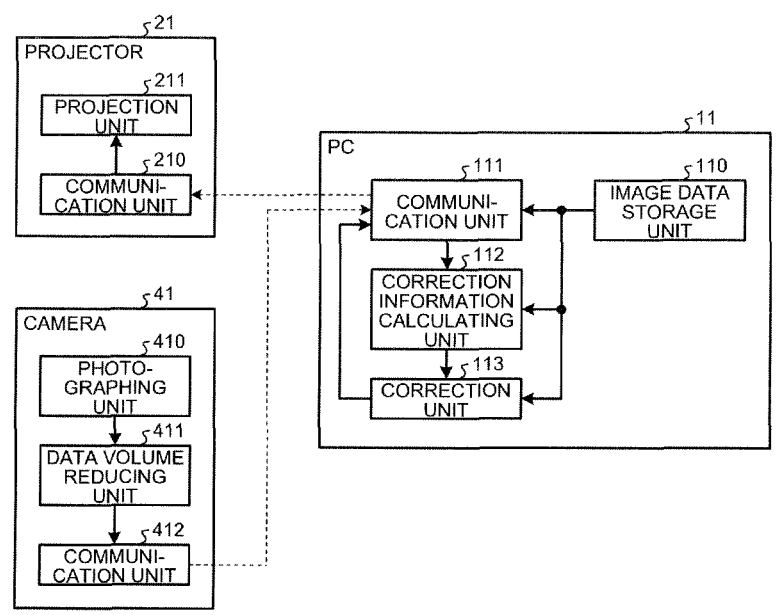
FIG. 3 is a block diagram illustrating a functional configuration of a PC, a projector, and a camera according to the first embodiment.

FIG. 3 is a block diagram illustrating a functional configuration of the PC 11, the projector 21, and the camera 41 according to the first embodiment. The PC 11 includes an image data storage unit 110, a communication unit 111, a correction information calculating unit 112, and a correction unit 113. The projector 21 includes a communication unit 210 and a projection unit 211. The camera 41 includes a photographing unit 410, a data volume reducing unit 411, and a communication unit 412.

The image data storage unit 110 of the PC 11 stores therein the content image and the pattern image to be projected by the projector 21 onto the screen 30. The communication unit 111 of the PC 11 performs communication with the projector 21 and the camera 41. The communication unit 111 sends, for example, image data to the projector 21. The communication unit 111 also receives images from the camera 41.

Alternatively, the pattern image and the content image may be stored in the projector 21 or the camera 41. The content image to be projected onto the projection surface is not limited to an image stored in the projector 21 or the camera 41, but may be an image stored in another device.

The communication unit 210 of the projector 21 receives the pattern image and the content image from the PC 11. The projection unit 211 projects the pattern image and the content image that have been received by the communication unit 210.

The photographing unit 410 of the camera 41 follows an operation from the user to take a photograph of an image including the screen 30 with the pattern image projected thereon by the projector 21.

The data volume reducing unit 411 reduces the data volume of the photographed image obtained by the photographing unit 410. Specifically, the data volume reducing unit 411 reduces the data volume of the photographed image by applying, to the photographed image, at least one type of processing selected from a scaling processing of reducing the magnification ratio of the photographed image by a certain amount, a color reduction processing of reducing the number of colors included in the photographed image by a certain amount, and a compression processing of compressing the photographed image to a particular ratio. The compression processing can use a compression technique such as a Joint Photographic Experts Group (JPEG) system, a JPEG 2000 system, or a Portable Network Graphics (PNG) system. Note that the photographed image taken by the photographing unit 410 corresponds to a first photographed image, and the photographed image after the data volume reduction corresponds to a second photographed image. The communication unit 412 sends the photographed image after the data volume reduction to the PC 11.

The correction information calculating unit 112 of the PC 11 calculates the correction information based on the photographed image received by the communication unit 111 and on the pattern image stored in the image data storage unit 110. The correction information refers to information for correcting the distortion of the content image to be projected by the projector 21 onto the screen 30, the distortion being caused by deflection or the like of the screen 30.

Specifically, the correction information calculating unit 112 calculates a relative positional relation between respective corresponding images in the photographed image and the pattern image, and calculates the correction information based on this positional relation. A corresponding point extraction program such as a scale-invariant feature transform (SIFT) program can be used for extracting the corresponding images. Alternatively, the technique of Japanese Patent Application Laid-open No. 2006-33357 can be referenced as a method of extracting the corresponding images.

Based on the correction information calculated by the correction information calculating unit 112, the correction unit 113 corrects the content image to be projected onto the screen 30 among content images stored in the image data storage unit 110, and thus obtains a corrected image.

Figure 4:
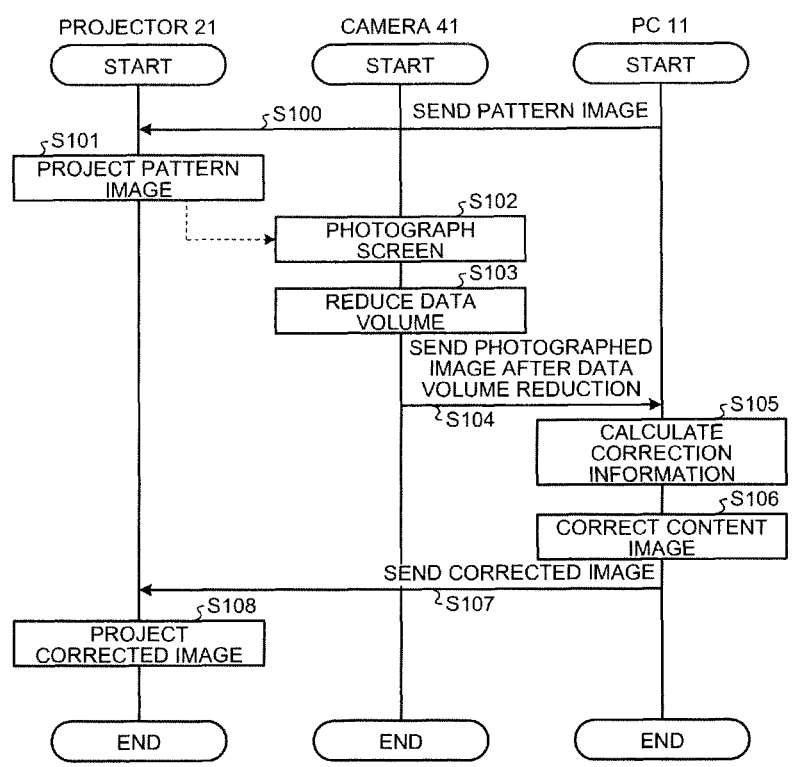
FIG. 4 is a sequence diagram illustrating an image correction operation according to the first embodiment.

FIG. 4 is a sequence diagram illustrating the image correction operation performed by the image processing system 1. First, the communication unit 111 of the PC 11 sends the pattern image stored in the image data storage unit 110 to the projector 21 (Step S100). In the projector 21, the communication unit 210 receives the pattern image, and then the projection unit 211 projects the pattern image onto the screen 30 (Step S101).

Next, the photographing unit 410 of the camera 41 follows the user operation to take a photograph of an image including the screen 30 (Step S102). Then, the data volume reducing unit 411 reduces the data volume of the photographed image obtained by the photographing unit 410 (Step S103). Then, the communication unit 412 sends the photographed image after the data volume reduction to the PC 11 (Step S104). In this manner, the data volume of the photographed image sent by the communication unit 412 is reduced, and thus the data transfer time can be shortened.

In the PC 11, after the communication unit 111 receives the photographed image, the correction information calculating unit 112 calculates the correction information based on the photographed image and the pattern image stored in the image data storage unit 110 (Step S105). Here, the photographed image used by the correction information calculating unit 112 is the image after the data volume reduction by the camera 41. Therefore, the amount of calculation required for calculating the correction information can be reduced, and thus the processing time can be shortened.

Next, based on the correction information, the correction unit 113 of the PC 11 corrects the content image to be projected to obtain a corrected image (Step S106). Then, the communication unit 111 sends the corrected image to the projector 21 (Step S107).

In the projector 21, after the communication unit 210 receives the corrected image, the projection unit 211 projects the corrected image (Step S108). Thus, the image correction operation is completed.

In this manner, the image processing system 1 according to the present embodiment projects the corrected image on the screen 30 so as to correct the distortion of the image projected on the screen 30.

In addition, because the data volume of the photographed image for obtaining the corrected image is reduced in the camera 41, the time required for transferring the data of the photographed image can be shortened. It is also possible to reduce the amount of calculation required for the correction information calculation process by the correction information calculating unit 112 in the PC 11.

Second Embodiment

Figure 5:
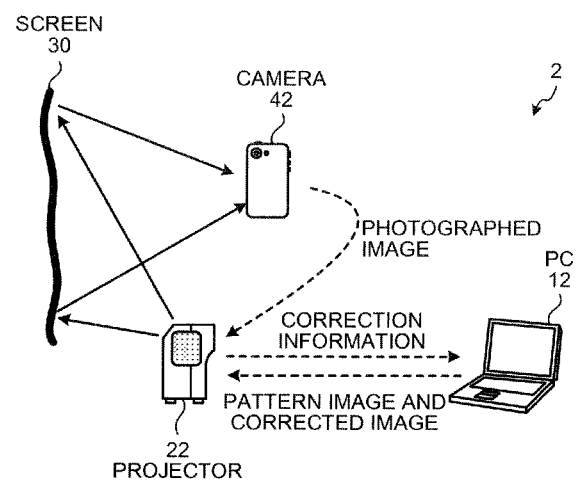
FIG. 5 is a diagram illustrating an overall configuration of an image processing system according to a second embodiment.

FIG. 5 is a diagram illustrating an overall configuration of an image processing system 2 according to a second embodiment. The image processing system 2 sends and receives various types of information between a camera 42 and a projector 22.

In the image processing system 2 according to the second embodiment, a photographed image obtained by the camera 42 is sent to the projector 22, and correction information is calculated in the projector 22 and sent to a PC 12. Based on the correction information calculated in the projector 22, the PC 12 corrects a content image to be projected to obtain a corrected image, and sends the corrected image to the projector 22.

Figure 6:
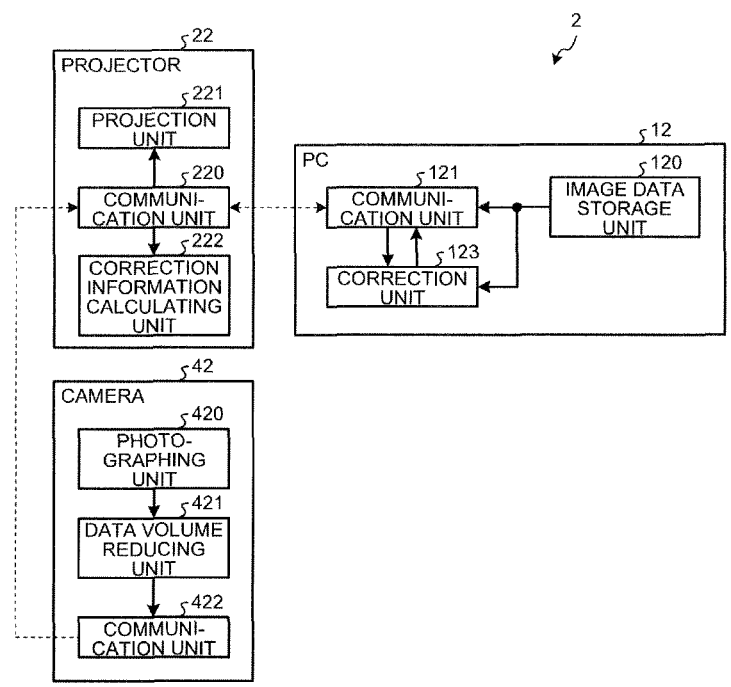
FIG. 6 is a block diagram illustrating a functional configuration of a PC, a projector, and a camera according to the second embodiment.

FIG. 6 is a block diagram illustrating a functional configuration of the PC 12, the projector 22, and the camera 42 according to the second embodiment. The PC 12 includes an image data storage unit 120, a communication unit 121, and a correction unit 123. The projector 22 includes a communication unit 220 and a projection unit 221, and includes, in addition, a correction information calculating unit 222. The camera 42 includes a photographing unit 420, a data volume reducing unit 421, and a communication unit 422.

In the image processing system 2 according to the present embodiment, the communication unit 422 of the camera 42 sends the photographed image to the projector 22. The correction information calculating unit 222 calculates the correction information based on the photographed image received by the communication unit 220 from the camera 42 and on a pattern image received by the communication unit 220 from the PC 12. The communication unit 220 then sends the correction information to the PC 12. Based on the correction information received by the communication unit 121, the correction unit 123 of the PC 12 corrects the content image to be projected to obtain the corrected image.

Figure 7:
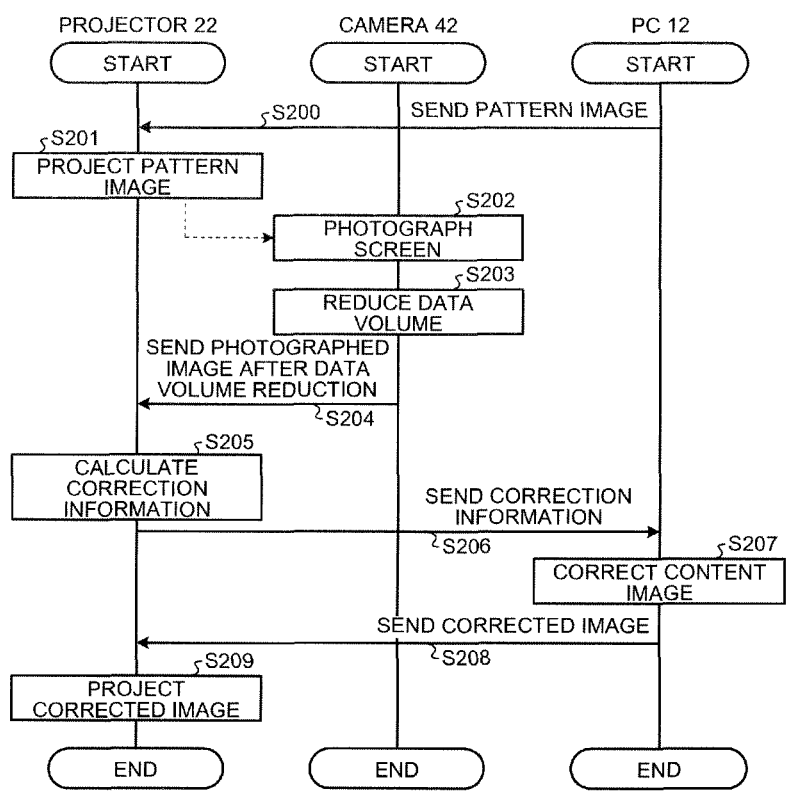
FIG. 7 is a sequence diagram illustrating an image correction operation according to the second embodiment.

FIG. 7 is a sequence diagram illustrating the image correction operation performed by the image processing system 2. The process of Steps S200 to S203 is the same as the process of Steps S100 to S103 of the image correction operation performed by the image processing system 1 according to the first embodiment, which has been described with reference to FIG. 4.

In the camera 42, the photographed image is reduced in data volume (Step 0203), and thereafter, the communication unit 422 sends the photographed image after the data volume reduction to the projector 22 (Step S204). In the projector 22, after the communication unit 220 receives the photographed image, the correction information calculating unit 222 calculates the correction information based on the photographed image and the pattern image (Step S205). Then, the communication unit 220 sends the correction information to the PC 12 (Step S206).

In the PC 12, after the communication unit 121 receives the correction information, the correction unit 123 corrects the content image to be projected based on the correction information so as to obtain the corrected image (Step S207). The process of Steps S207 to S209 is the same as the process of Steps S106 to S108 according to the first embodiment.

As described above, the image processing system 2 according to the present embodiment can correct the distortion of the image projected on the screen 30 by projecting the corrected image on the screen 30 in the same manner as the image processing system 1 according to the first embodiment. In addition, because the data volume of the photographed image for obtaining the corrected image is reduced in the camera 42, it is possible to shorten the time required for transferring the data of the photographed image, and to reduce the amount of calculation required for the correction information calculation.

Furthermore, in the image processing system 2 according to the second embodiment, the projector 22 calculates the correction information. As a result, when the PC 12 is replaced with another device in the image processing system 2, the projector 22 sends the correction information to the device after the replacement so as to apply, to the content image stored in the device after the replacement, the correction for correcting the distortion occurring when the content image is projected on the screen 30. This eliminates the necessity for the device after the replacement to have a function required to generate the corrected image. This also eliminates the necessity to calculate the correction information each time the PC 12 is replaced with another device, thereby increasing the processing efficiency.

Other configurations and processes of the image processing system 2 according to the second embodiment are the same as those of the image processing system 1 according to the first embodiment.

Third Embodiment

Figure 8:
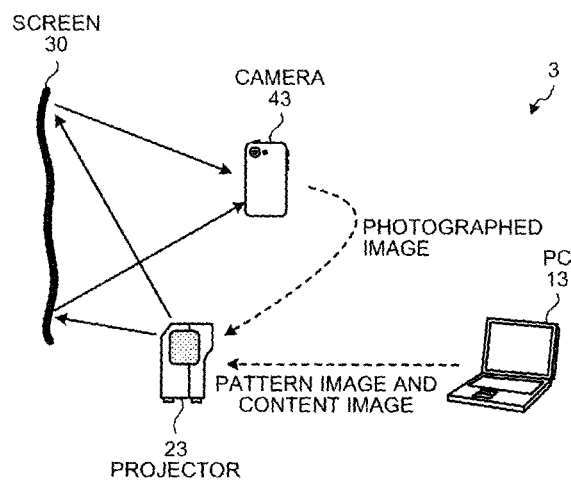
FIG. 8 is a diagram illustrating an overall configuration of an image processing system according to a third embodiment.

FIG. 8 is a diagram illustrating an overall configuration of an image processing system 3 according to a third embodiment. In the image processing system 3 according to the third embodiment, a photographed image obtained by a camera 43 is sent to a projector 23, and the projector 23 calculates correction information and further obtains a corrected image.

Figure 9:
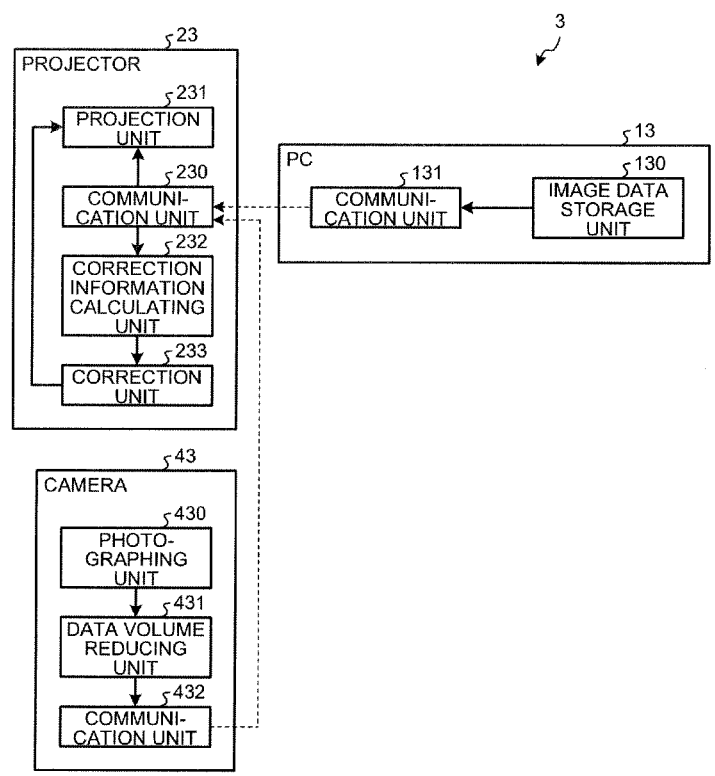
FIG. 9 is a block diagram illustrating a functional configuration of a PC, a projector, and a camera according to the third embodiment.

FIG. 9 is a block diagram illustrating a functional configuration of a PC 13, the projector 23, and the camera 43 according to the third embodiment. The PC 13 includes an image data storage unit 130 and a communication unit 131. The projector 23 includes a communication unit 230 and a projection unit 231, and includes, in addition, a correction information calculating unit 232 and a correction unit 233. The camera 43 includes a photographing unit 430, a data volume reducing unit 431, and a communication unit 432.

In the image processing system 3 according to the present embodiment, the communication unit 432 of the camera 43 sends the photographed image to the projector 23. The correction information calculating unit 232 calculates the correction information based on the photographed image received by the communication unit 230 from the camera 43 and on a pattern image received by the communication unit 230 from the PC 13. Based on the correction information, the correction unit 233 corrects the content image to be projected to obtain the corrected image. The projection unit 231 projects the corrected image onto the screen 30.

Figure 10:
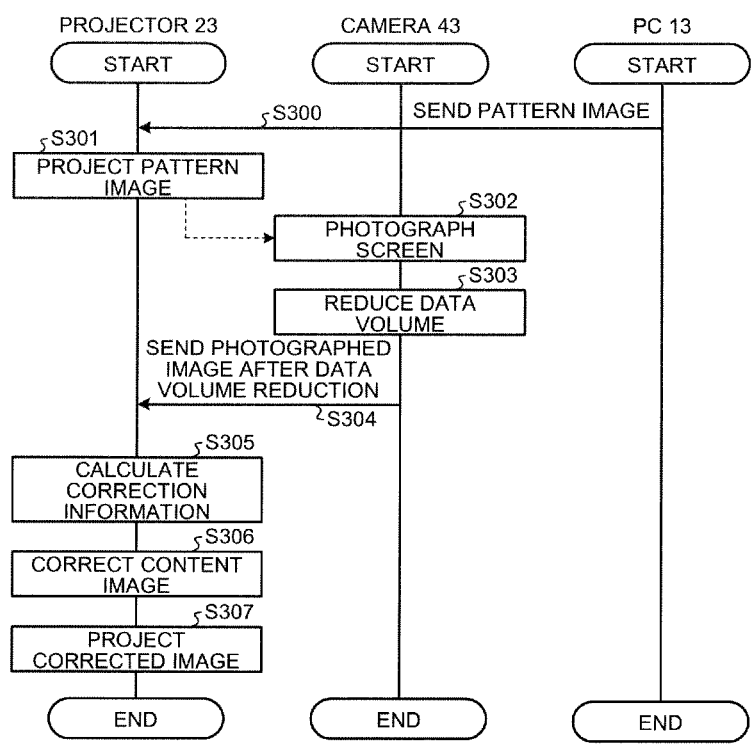
FIG. 10 is a sequence diagram illustrating an image correction operation according to the third embodiment.

FIG. 10 is a sequence diagram illustrating the image correction operation by the image processing system 3. The process of Steps S300 to S305 is the same as the process of Steps S200 to S205 of the image correction operation by the image processing system 2 according to the second embodiment, which has been described with reference to FIG. 7.

In the projector 23, the correction information is calculated (Step S305), and then, based on the correction information, the correction unit 233 corrects the content image to be projected that has been received from the PC 13, and thus obtains the corrected image (Step S306). Then, the projection unit 231 projects the corrected image obtained by the correction unit 233 onto the screen 30 (Step S307). Thus, the image correction operation is completed.

As described above, the image processing system 3 according to the present embodiment can correct the distortion of the image projected on the screen 30 by projecting the corrected image on the screen 30 in the same manner as the image processing systems according to the other embodiments of the present invention. In addition, because the data volume of the photographed image for obtaining the corrected image is reduced in the camera 43, it is possible to shorten the time required for transferring the data of the photographed image, and to reduce the amount of calculation required for the correction information calculation.

Furthermore, because the projector 23 calculates the correction information and obtains the corrected image in the image processing system 3 according to the third embodiment, the PC 13 only needs to send the content image to be projected on the screen 30 and need not have a function required to generate the corrected image. This allows the projector 23 to project, onto the screen 30, a corrected image corresponding to a content image received from not only the PC 13 but also a television or a camera.

Other configurations and processes of the image processing system 3 according to the third embodiment are the same as those of the image processing systems according to the other embodiments.

Fourth Embodiment

Figure 11:
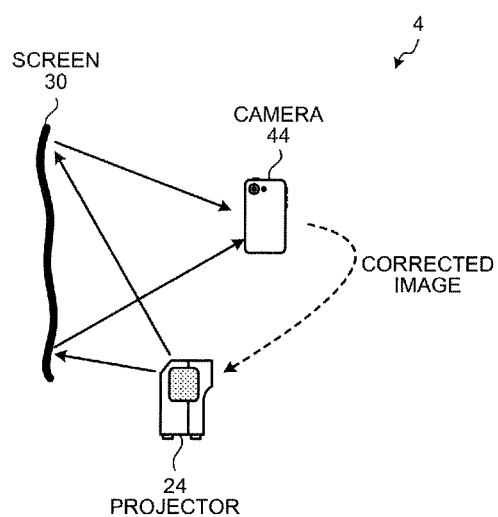
FIG. 11 is a diagram illustrating an overall configuration of an image processing system according to a fourth embodiment.

FIG. 11 is a diagram illustrating an overall configuration of an image processing system 4 according to a fourth embodiment. In the image processing system 4 according to the fourth embodiment, a camera 44 generates a corrected image from a photographed image and sends the corrected image to a projector 24.

Figure 12:
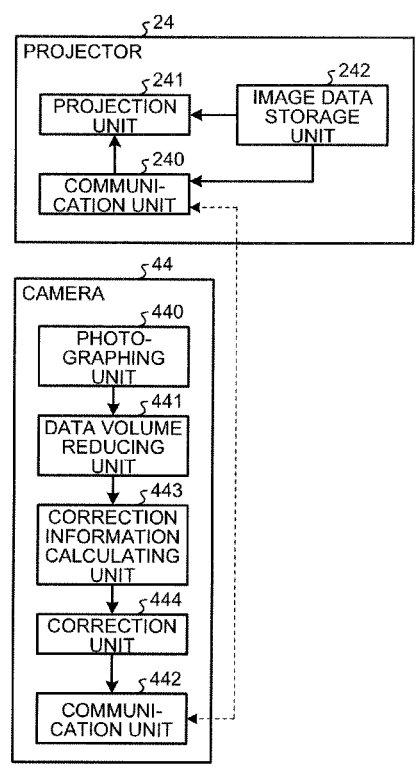
FIG. 12 is a block diagram illustrating a functional configuration of a projector and a camera according to the fourth embodiment.

FIG. 12 is a block diagram illustrating a functional configuration of the projector 24 and the camera 44 according to the fourth embodiment. The projector 24 includes a communication unit 240, a projection unit 241, and an image data storage unit 242. The camera 44 includes a photographing unit 440, a data volume reducing unit 441, a communication unit 442, a correction information calculating unit 443, and a correction unit 444.

In the image processing system 4 according to the present embodiment, the communication unit 442 receives a pattern image and a content image from the projector 24. The correction information calculating unit 443 calculates correction information based on the photographed image after data volume reduction by the data volume reducing unit 441 and based on the pattern image. Based on the correction information, the correction unit 444 corrects the content image received by the communication unit 442 to obtain the corrected image. The communication unit 442 then sends the corrected image to the projector 24.

Figure 13:
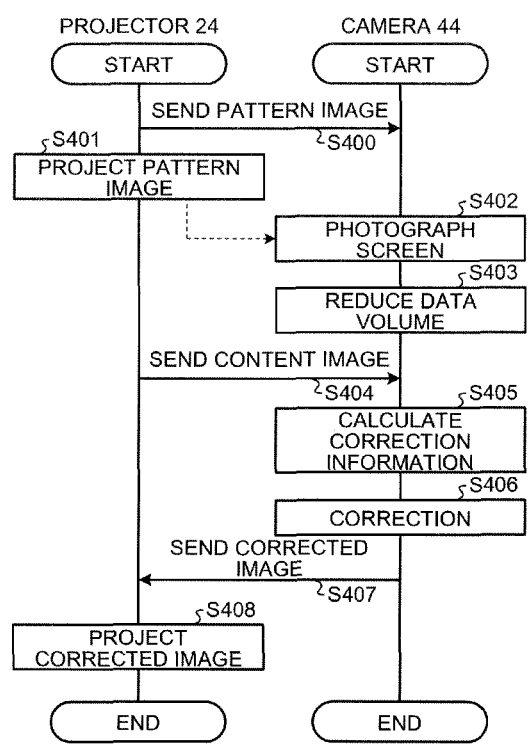
FIG. 13 is a sequence diagram illustrating an image correction operation according to the fourth embodiment.

FIG. 13 is a sequence diagram illustrating the image correction operation performed by the image processing system 4. In the image processing system 4, the communication unit 240 of the projector 24 first sends the pattern image to the camera 44 (Step S400). The subsequent process of Steps S401 to S403 is the same as the process of Steps S101 to S103 of the image correction operation performed by the image processing system 1 according to the first embodiment, which has been described with reference to FIG. 4.

The communication unit 240 of the projector 24 further sends the content image to be projected to the camera 44 (Step S404). Note that the projector 24 can send the content image to the camera 44 at any time. The projector 24 can send the content image to the camera 44 at the same time of sending the pattern image to the camera 44, or, as another example, before sending the pattern image to the camera 44.

In the camera 44, after the communication unit 442 receives the content image from the projector 24, the correction information calculating unit 443 calculates the correction information based on the pattern image received by the communication unit 442 and based on the photographed image after the data volume reduction by the data volume reducing unit 441 (Step S405). Then, based on the correction information, the correction unit 444 corrects the content image received by the communication unit 442, that is, the content image to be projected, to obtain the corrected image (Step S406). Next, the communication unit 442 sends the corrected image to the projector 24 (Step S407). Then, the projection unit 241 of the projector 24 projects the corrected image received by the communication unit 240 from the camera 44 onto the screen 30 (Step S408). Thus, the image correction operation is completed.

As described above, the image processing system 4 according to the present embodiment can correct the distortion of the image projected on the screen 30 by projecting the corrected image on the screen 30 in the same manner as the image processing systems according to the other embodiments. In addition, because the data volume of the photographed image for obtaining the corrected image is reduced in the camera 44, it is possible to shorten the time required for transferring the data of the photographed image, and to reduce the amount of calculation required for the correction information calculation.

Moreover, because the camera 44 can perform the sequence of processes up to generating the corrected image in the image processing system 4 according to the fourth embodiment, the configuration of the image processing system 4 can be simplified. Furthermore, the projector 24 need not have a function related to the generation of the corrected image, and thus, when the projector 24 is replaced with another projector, it is only necessary to send the corrected image to the projector after the replacement. In this manner, the correction information need not be generated again after the projector is replaced. This leads to a possibility of achieving a more efficient processing. The projector 24 can also project a corrected image corresponding to image data received from a television or a camera onto the screen 30.

Other configurations and processes of the image processing system 4 according to the fourth embodiment are the same as those of the image processing systems according to the other embodiments.

As a modification of the image processing system 4 according to the fourth embodiment, the content image and the pattern image may be stored in a storage unit of the camera 44 instead of in the image data storage unit 242 of the projector 24. In this case, the camera 44 sends the pattern image to the projector 24, and the projector 24 projects the pattern image received from the camera 44 onto the screen 30. The camera 44 further obtains the corrected image from the content image stored in the storage unit of the camera 44, and sends the corrected image to the projector 24.

Fifth Embodiment

Figure 14:
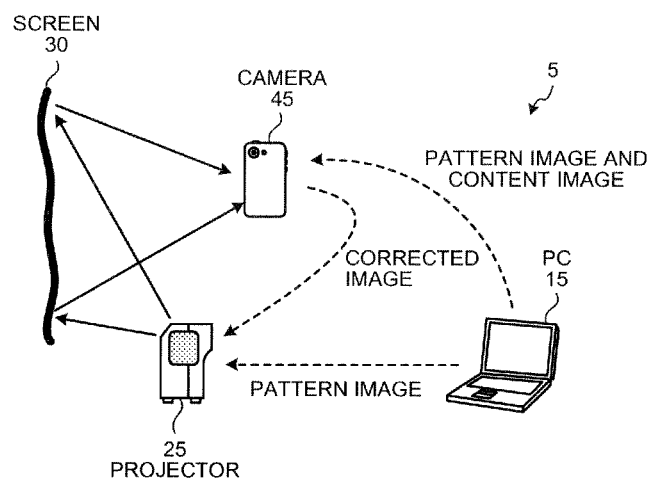
FIG. 14 is a diagram illustrating an overall configuration of an image processing system according to a fifth embodiment.

FIG. 14 is a diagram illustrating an overall configuration of an image processing system 5 according to a fifth embodiment of the present invention. In the image processing system 5 according to the fifth embodiment, in the same manner as in the image processing system 4 according to the fourth embodiment, a camera 45 generates a corrected image from a photographed image and sends the corrected image to a projector 25. However, in the image processing system 5 according to the present embodiment, an image data storage unit 150 is provided in a PC 15.

Figure 15:
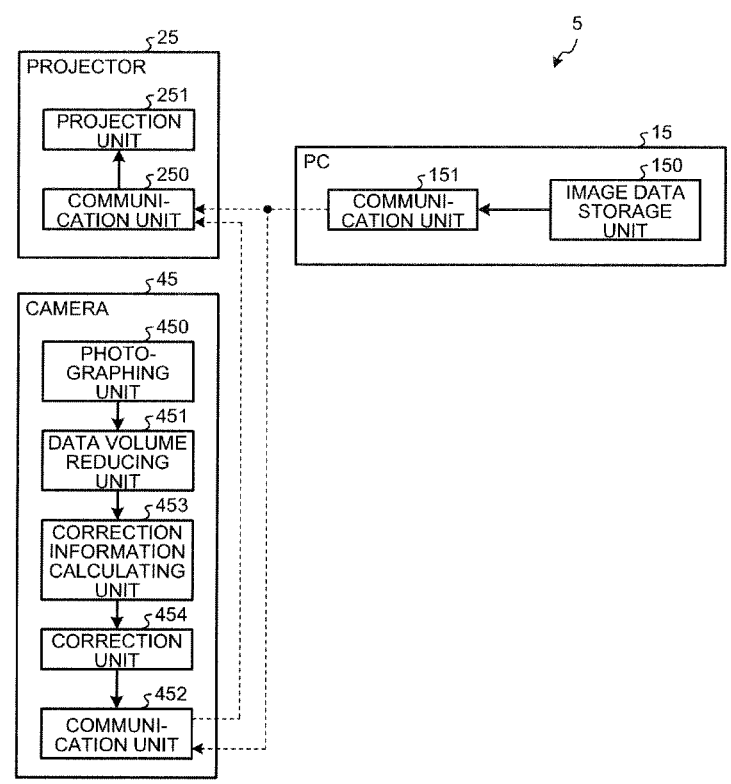
FIG. 15 is a block diagram illustrating a functional configuration of a PC, a projector, and a camera according to the fifth embodiment.

FIG. 15 is a block diagram illustrating a functional configuration of the PC 15, the projector 25, and the camera 45 according to the fifth embodiment. The PC 15 includes the image data storage unit 150 and a communication unit 151. The projector 25 includes a communication unit 250 and a projection unit 251. The camera 45 includes a photographing unit 450, a data volume reducing unit 451, a communication unit 452, a correction information calculating unit 453, and a correction unit 454.

In the image processing system 5 according to the present embodiment, the communication unit 151 of the PC 15 sends a pattern image to projector 25 and the camera 45. The communication unit 452 of the camera 45 receives the pattern image from the PC 15. The correction information calculating unit 453 calculates correction information based on the photographed image after data volume reduction by the data volume reducing unit 451 and on the pattern image received from the PC 15. Based on the correction information, the correction unit 454 corrects a content image to be projected that has been received by the communication unit 452, and thus obtains the corrected image. The communication unit 452 then sends the corrected image to the projector 25.

Figure 16:
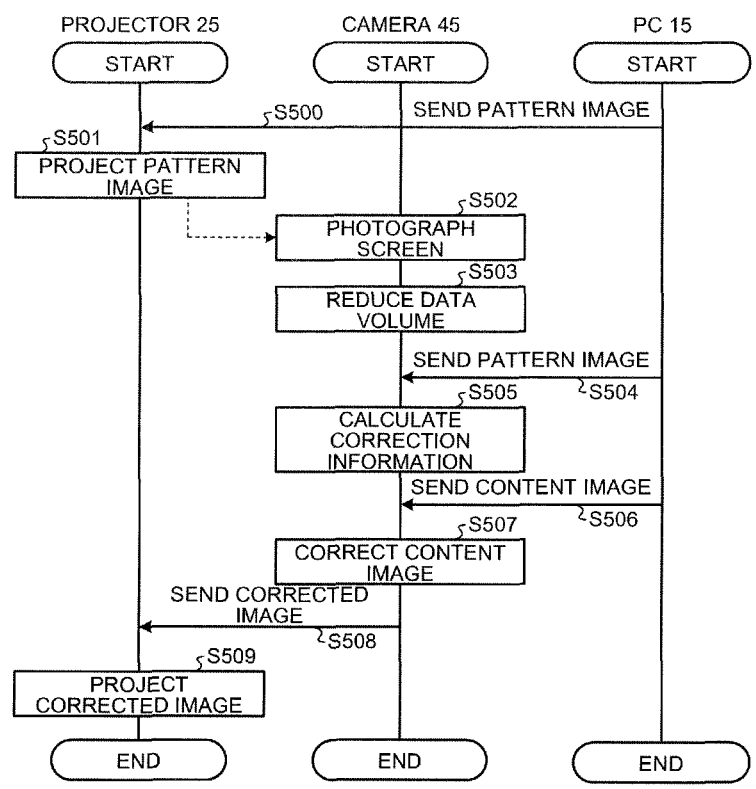
FIG. 16 is a sequence diagram illustrating an image correction operation according to the fifth embodiment.

FIG. 16 is a sequence diagram illustrating the image correction operation performed by the image processing system 5. The process of Steps S500 to S503 is the same as the process of Steps S100 to S103 of the projection image correction operation performed by the image processing system 1 according to the first embodiment, which has been described with reference to FIG. 4.

The communication unit 151 of the PC 15 sends the pattern image to the projector 25, and also sends the pattern image to the camera 45 (Step S504). Note that the PC 15 can send the pattern image to the camera 45 at any time. The PC 15 can send the pattern image to the camera 45 at the same time of sending the pattern image to the projector 25, or, as another example, before sending the projection image to the projector 25.

In the camera 45, after the communication unit 452 receives the pattern image from the PC 15, the correction information calculating unit 453 calculates the correction information based on the pattern image received by the communication unit 452 and based on the photographed image after the data volume reduction by the data volume reducing unit 451 (Step S505). Then, the communication unit 452 receives the content image to be projected from the PC 15 (Step S506). The time of receiving the content image by the camera 45 is not limited to that of the embodiment, but may be the time before Step S505.

Then, based on the correction information, the correction unit 454 corrects the content image to be projected that has been received by the communication unit 452, and thus obtains the corrected image (Step S507). Next, the communication unit 452 sends the corrected image to the projector 25 (Step S508). Then, the projection unit 251 of the projector 25 projects the corrected image received by the communication unit 250 from the camera 45 onto the screen 30 (Step S509). Thus, the image correction operation is completed.

As described above, the image processing system 5 according to the present embodiment can correct the distortion of the projection image projected on the screen 30 by projecting the corrected image on the screen 30 in the same manner as the image processing systems according to the other embodiments. In addition, because the data volume of the photographed image for obtaining the corrected image is reduced in the camera 45, it is possible to shorten the time required for transferring the data of the photographed image, and to reduce the amount of calculation required for the correction information calculation.

Moreover, because the camera 45 can perform the sequence of processes up to generating the corrected image in the image processing system 5 according to the fifth embodiment, the configuration of the image processing system 5 can be simplified. Furthermore, the projector 25 need not have a function related to the generation of the corrected image, and thus, when the projector 25 is replaced with another projector, it is only necessary to send the corrected image to the projector after the replacement. In this manner, the corrected image need not be generated again after the projector is replaced. Nor does the corrected image need to be generated after the PC 15 is replaced with another device. This leads to a possibility of achieving a more efficient processing. The projector 25 can project, onto the screen 30, a corrected image corresponding to image data received from not only the PC 15 but also a television or a camera.

Other configurations and processes of the image processing system 5 according to the fifth embodiment are the same as those of the image processing systems according to the other embodiments.

Sixth Embodiment

Figure 17:
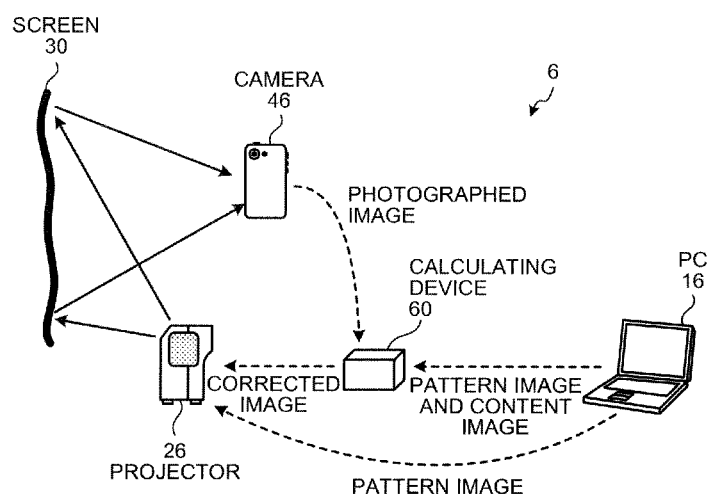
FIG. 17 is a diagram illustrating an overall configuration of an image processing system according to a sixth embodiment.

FIG. 17 is a diagram illustrating an overall configuration of an image processing system 6 according to a sixth embodiment. The image processing system 6 according to the sixth embodiment is provided with a PC 16, a projector 26, and a camera 46, and is also provided with a calculating device 60 that generates corrected images. The calculating device 60 sends and receives various types of information to and from the PC 16, the projector 26, and the camera 46.

The image processing system 6 sends a photographed image from the camera 46 to the calculating device 60, and sends a pattern image and a content image from the PC 16 to the calculating device 60. The pattern image is also sent from the PC 16 to the projector 26. The corrected image is generated by the calculating device 60 and sent to the projector 26.

Figure 18:
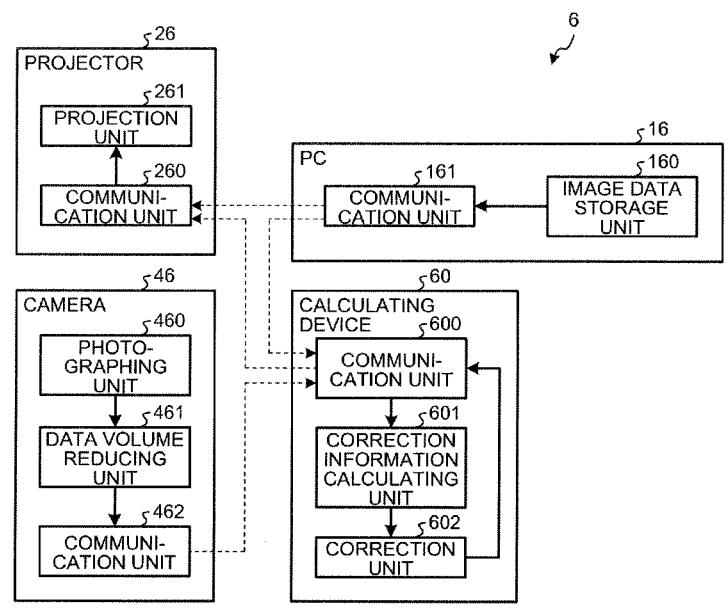
FIG. 18 is a block diagram illustrating a functional configuration of a PC, a projector, a camera, and a calculating device according to the sixth embodiment.

FIG. 18 is a block diagram illustrating a functional configuration of the PC 16, the projector 26, the camera 46, and the calculating device 60 according to the sixth embodiment. The PC 16 includes an image data storage unit 160 and a communication unit 161. The projector 26 includes a communication unit 260 and a projection unit 261. The camera 46 includes a photographing unit 460, a data volume reducing unit 461, and a communication unit 462. The calculating device 60 includes a communication unit 600, a correction information calculating unit 601, and a correction unit 602.

In the image processing system 6 according to the present embodiment, the communication unit 161 of the PC 16 sends the pattern image and the content image to the calculating device 60. The communication unit 161 sends also the pattern image to the projector 26. The communication unit 462 of the camera 46 sends the photographed image after data volume reduction to the calculating device 60.

The communication unit 600 of the calculating device 60 receives the pattern image from the PC 16, and receives the photographed image from the camera 46. The correction information calculating unit 601 of the calculating device 60 calculates correction information based on the photographed image and the content image that have been received by the communication unit 600. Based on the correction information calculated by the correction information calculating unit 601, the correction unit 602 corrects the content image received by the communication unit 600 to obtain the corrected image. The communication unit 600 then sends the corrected image to the projector 26.

Figure 19:
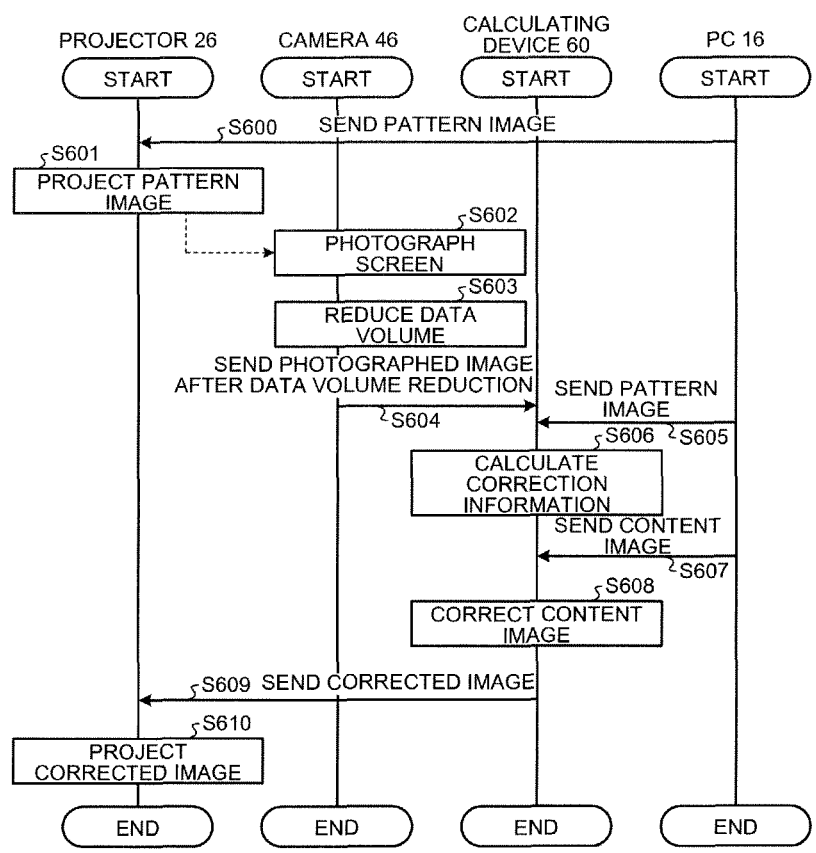
FIG. 19 is a sequence diagram illustrating an image correction operation according to the sixth embodiment.

FIG. 19 is a sequence diagram illustrating the image correction operation performed by the image processing system 6. The process of Steps S600 to S603 is the same as the process of Steps S100 to S103 of the image correction operation by the image processing system 1 according to the first embodiment, which has been described with reference to FIG. 4.

After reducing the data volume of the photographed image at Step S603, the camera 46 sends the photographed image after the data volume reduction to the calculating device 60 (Step S604). The PC 16 sends the pattern image to the calculating device 60 (Step S605). Note that the PC 16 can send the pattern image to the calculating device 60 at any time.

In the calculating device 60, after the communication unit 600 receives the photographed image from the camera 46, the correction information calculating unit 601 calculates the correction information based on the pattern image and the photographed image that have been received by the communication unit 600 (Step S606). Then, the communication unit 600 receives the content image to be projected from the PC 16 (Step S607). Note that the communication unit 600 can receive the content image at any time.

Then, based on the correction information, the correction unit 602 corrects the content image to be projected that has been received by the communication unit 600, and thus obtains the corrected image (Step S608). Next, the communication unit 600 sends the corrected image to the projector 26 (Step S609). Then, the projection unit 261 projects the corrected image received by the communication unit 260 from the calculating device 60 onto the screen 30 (Step S610). Thus, the image correction operation is completed.

As described above, the image processing system 6 according to the present embodiment can correct the distortion of the image projected on the screen 30 by projecting the corrected image on the screen 30 in the same manner as the image processing systems according to the other embodiments. In addition, because the data volume of the photographed image for obtaining the corrected image is reduced in the camera 46, it is possible to shorten the time required for transferring the data of the photographed image, and to reduce the amount of calculation required for the correction information calculation process.

Moreover, the calculating device 60 calculates the correction information and further generates the corrected image in the image processing system 6 according to the sixth embodiment. This eliminates the necessity for both the PC 16 and the projector 26 to have a function required to generate the corrected image.

Other configurations and processes of the image processing system 6 according to the sixth embodiment are the same as those of the image processing systems according to the other embodiments.

While the image processing system has been described above using the embodiments, various modifications or improvements can be added to the above-described embodiments.

As a first modification, a particular device may calculate the correction information and send it to another device or other devices so that a plurality of such devices store therein the correction information. This modification allows each of the devices storing therein the correction information to generate a corrected image.

Figure 20:
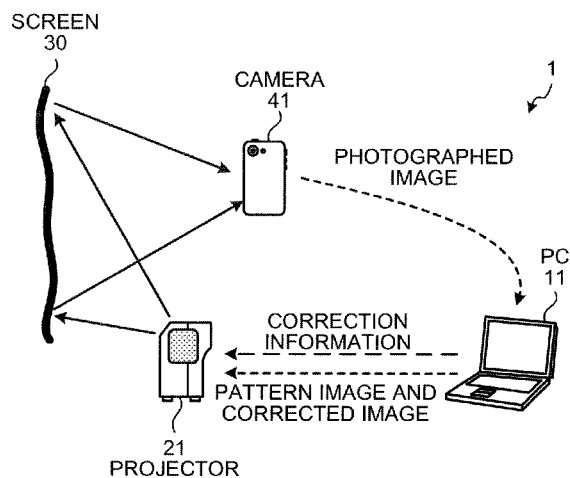
FIG. 20 is a diagram illustrating a first modification of the image processing system according to the first embodiment.
Figure 21:
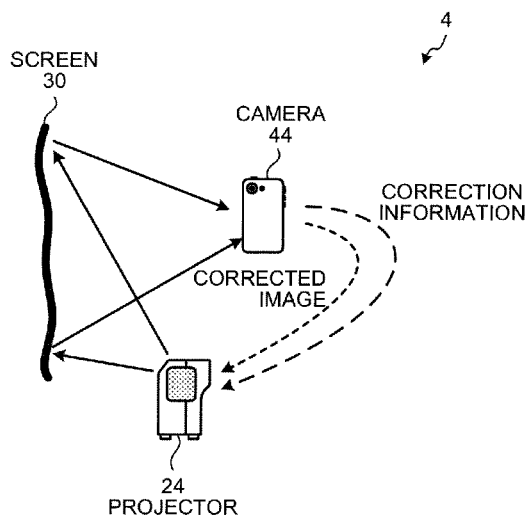
FIG. 21 is a diagram illustrating a modification of the image processing system according to the fourth embodiment.

For example, as illustrated in FIG. 20, the correction information generated in the PC 11 of the image processing system 1 according to the first embodiment may be stored in the projector 21. As another example, as illustrated in FIG. 21, the correction information generated in the camera 44 of the image processing system 4 according to the fourth embodiment may be stored in the projector 24. This example allows the projector 24 to generate a corrected image.

As still another example, the correction information calculated in the projector 22 of the image processing system 2 according to the second embodiment may be stored in the camera 42 or the PC 12. This example allows the camera and the PC to generate a corrected image.

Figure 22A:
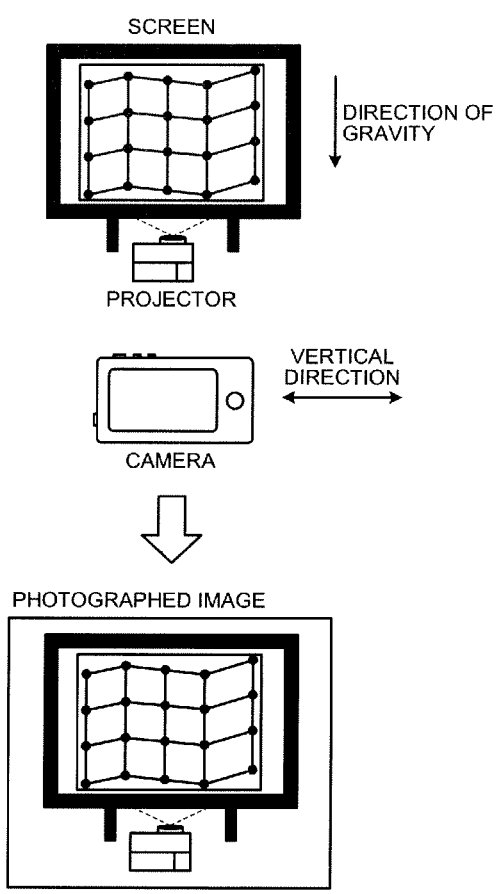
FIG. 22A is a diagram illustrating a photographed image taken while a camera is held with the vertical direction thereof substantially perpendicular to the direction of gravity.

As a second modification, the image processing system may change the vertical direction of the photographed image taken by the camera. When taking a photograph with the camera, the user holds the camera in various directions. FIG. 22A is a diagram illustrating a photographed image taken while the camera is held with the vertical direction thereof substantially perpendicular to the direction of gravity. FIG. 22B is a diagram illustrating a photographed image taken while the camera is held with the vertical direction thereof substantially parallel to the direction of gravity.

As illustrated in FIG. 22A, in the photographed image taken while the camera is held with the vertical direction thereof substantially perpendicular to the direction of gravity, the vertical direction of the projection image is substantially perpendicular to the long-side direction of the photographed image. Compared with this, as illustrated in FIG. 22B, in the photographed image taken while the camera is held with the vertical direction thereof substantially parallel to the direction of gravity, the vertical direction of the projection image is substantially parallel to the long-side direction of the photographed image. In this manner, the relation between the vertical direction of the photographed image and the vertical direction of the projection image changes depending on the state of holding the camera by the user.

However, the correction information calculation is performed with the vertical direction of the photographed image predetermined. Therefore, correction information cannot be correctly calculated from a photographed image that obtained while the camera is held in a direction different from the direction assumed in the correction information calculation.

For example, when the vertical direction of the pattern image projected on the screen 30 is assumed to be perpendicular to the long-side direction of the photographed image, correction information cannot be correctly calculated from a photographed image in which the vertical direction of the pattern image is parallel to the long-side direction of the photographed image.

Therefore, the image processing system according to the present modification performs rotating the photographed image so as to align the vertical direction of the photographed image with the vertical direction of the pattern image.

Figure 23:
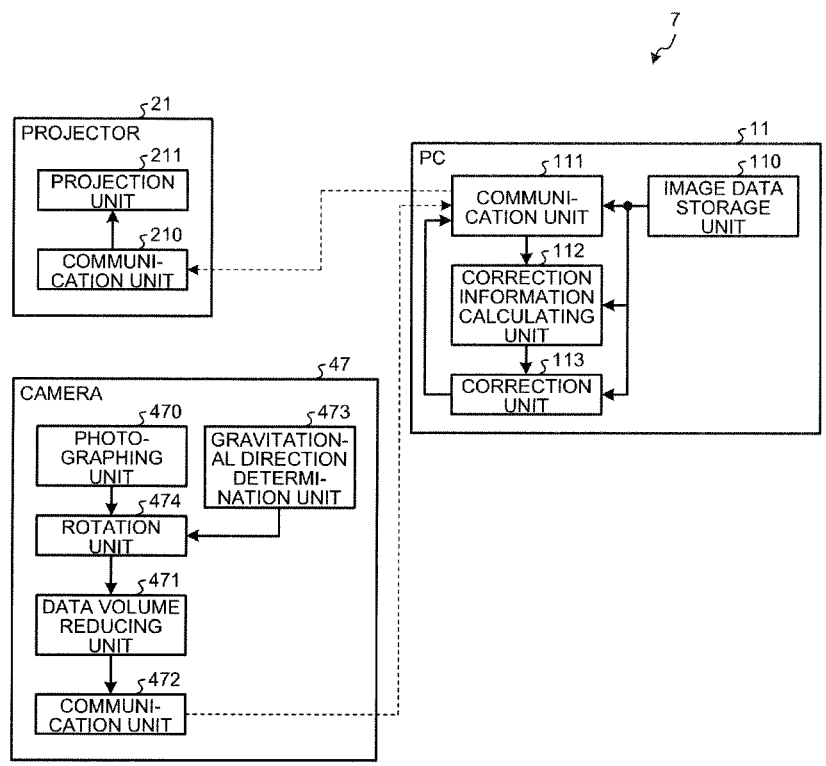
FIG. 23 is a block diagram illustrating a functional configuration of an image processing system according to a second modification.

FIG. 23 is a block diagram illustrating a functional configuration of an image processing system 7 according to the second modification. The image processing system 7 has almost the same configuration as that of the image processing system 1 according to the first embodiment. In the image processing system 7, a camera 47 includes a photographing unit 470, a data volume reducing unit 471, and a communication unit 472, and includes, in addition, a gravitational direction determination unit 473 and a rotation unit 474.

The gravitational direction determination unit 473 is, for example, an acceleration sensor, and determines the direction of gravity. Based on the direction of gravity obtained by the gravitational direction determination unit 473 at the time of shooting of the photographed image, the rotation unit 474 rotates the photographed image so that the vertical direction of the photographed image coincides with the direction of gravity. In other words, the rotation unit 474 serves as a vertical direction changing unit that changes the vertical direction of the photographed image.

As described above, the image processing system 7 according to the present modification can align the vertical direction of the photographed image with the vertical direction of the pattern image, and thereby can generate correct correction information.

The image processing system 7 also rotates the photographed image as described above, and thereby eliminates the necessity to limit the vertical direction of the camera when the user is taking a photograph of the image. This allows the user to take the photograph without regard to the direction of the camera at the time of shooting.

Figure 24:
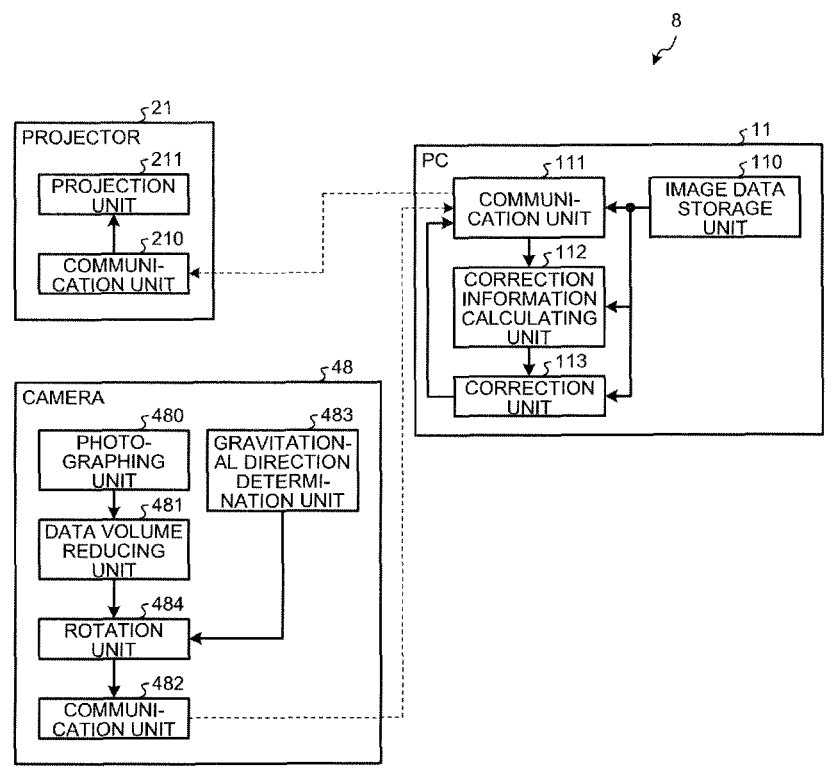
FIG. 24 is a block diagram illustrating a functional configuration of an image processing system according to another example.

FIG. 24 is a block diagram illustrating a functional configuration of an image processing system 8 according to another example. The image processing system 8 has almost the same configuration as that of the image processing system 7. A camera 48, a photo-graphing unit 480, a data volume reducing unit 481, a communication unit 482, a gravitational direction determination unit 483, and a rotation unit 484 correspond to the camera 47, the photo graphing unit 470, the data volume reducing unit 471, the communication unit 472, the gravitational direction determination unit 473, and the rotation unit 474, respectively. In the image processing system 8, the rotation unit 484 rotates a photographed image after data volume reduction so that the vertical direction of the photographed image after data volume reduction coincides with the vertical direction determined by the gravitational direction determination unit 483. As a result, the amount of calculation required for rotation of the photographed image can be reduced, thereby shortening the processing time.

Figure 25:
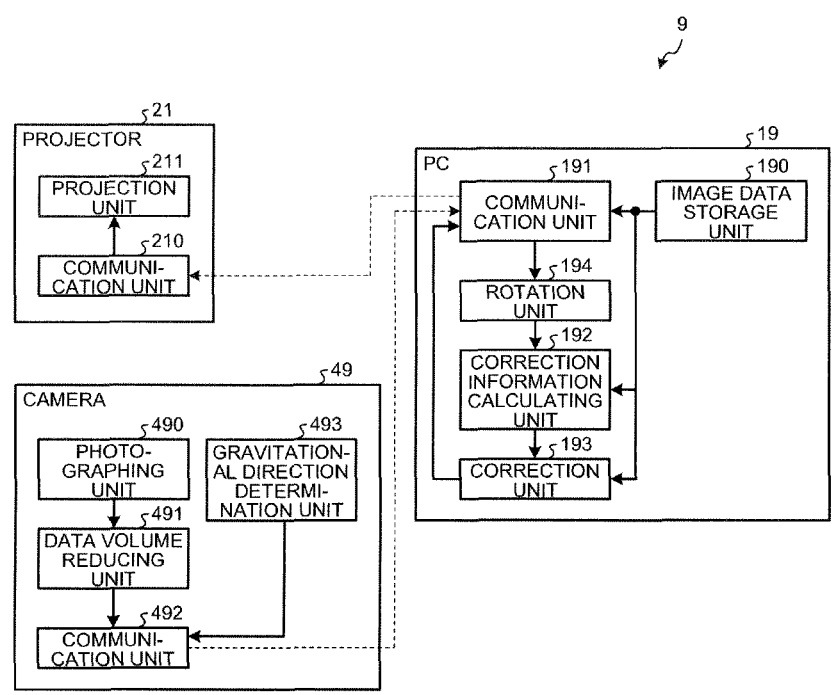
FIG. 25 is a block diagram illustrating a functional configuration of an image processing system according to still another example.

FIG. 25 is a block diagram illustrating a functional configuration of an image processing system 9 according to still another example. In the image processing system 9, a camera 49 includes a photographing unit 490, a data volume reducing unit 491, and a communication unit 492, and includes, in addition, a gravitational direction determination unit 493.

Furthermore, a PC 19 includes an image data storage unit 190, a communication unit 191, a correction information calculating unit 192, and a correction unit 193, and includes, in addition, a rotation unit 194.

In the image processing system 9, the communication unit 492 sends, in addition to the photographed image after data volume reduction, gravitational direction information that indicates the direction of gravity determined by the gravitational direction determination unit 493 to the PC 19.

In the PC 19, the communication unit 191 receives the gravitational direction information in addition to the photographed image. Then, based on the gravitational direction information, the rotation unit 194 rotates the vertical direction of the photographed image so as to align the vertical direction of the photographed image with the vertical direction of the pattern image.

The rotation unit may be provided in the projector as further still another example. As described above, the rotation of the photographed image may be performed by a device other than the camera. For example, if the PC has a higher processing performance than the camera, the PC can perform the rotation so as to shorten the processing time required for the rotation.

While the above description has been made of the rotation of the photographed image by the rotation unit based on the direction of gravity determined by the acceleration sensor, another example may be such that a device for performing the rotation accepts an input of a rotational angle in the rotation from the user and rotates the photographed image by the entered rotational angle.

A rotation device for performing the rotation may be a different device from an input device for accepting the input of the rotational angle. In this case, the input device for the rotational angle sends information indicating the entered rotational angle to the rotation device. The rotation device rotates the photographed image based on the information indicating the rotational angle.

As a third modification, the pattern image and the content image may be stored in any of the PC, the projector, and the camera of the image processing system. The projector only needs to receive the pattern image from a device storing therein the pattern image and to project it onto the screen. A device for generating the corrected image only needs to receive the content image from a device storing therein the content image and to generate the corrected image based on the correction information. The device storing therein the content image may be a device other than devices of the image processing system 1.

Seventh Embodiment

Figure 26:
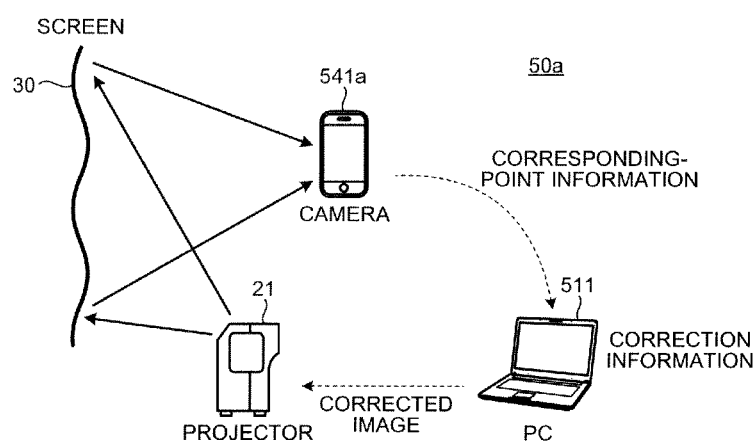
FIG. 26 is a diagram illustrating a configuration example of an image processing system according to a seventh embodiment.

FIG. 26 is a diagram illustrating a configuration example of an image processing system 50a according to a seventh embodiment. As illustrated in FIG. 26, the image processing system 50a according to the present embodiment includes a PC 511, the projector (projection device) 21, and a camera (photographing device) 541a. Devices such as the PC 511, the projector 21, and the camera 541a are connected to each other via a particular data transmission path.

The PC 511 is a device having an information processing function, and stores therein projection images (data such as content images) to be projected onto the screen 30 in a particular storage area of a storage device. The projector 21 is a device having a projecting function, and projects the image onto the screen 30. The camera 541a is a device having a photographing function, and corresponds to, for example, a digital camera, a camera phone, or a smartphone. The camera

541*a* follows a user operation to take a photograph of an area including the screen 30 with the image projected thereon. In other words, a photographed image taken by the camera 541*a* includes the projection image on the screen 30.

The image processing system 50*a* according to the present embodiment corrects the distortion produced in the projection image projects the image without distortion onto the screen 30 through the following operations performed by the respective devices. First, the camera 541*a* acquires, from the photographed image taken thereby, position information of a corresponding point corresponding to a feature point of the projection image (coordinate values, hereinafter called corresponding-point information), and sends the acquired corresponding-point information to the PC 511. This leads the PC 511 to calculate, based on the received corresponding-point information, correction information (coordinate movement amounts to eliminate the distortion) to correct the distortion of the projection image on the screen 30 (projection surface). Next, based on the calculated correction information, the PC 511 corrects the content image to be projected, and sends the image data after being corrected to the projector 21. This leads the projector 21 to project the received image after correction (hereinafter called corrected image) onto the screen 30. As a result, the image processing system 50*a* according to the present embodiment projects the image without distortion on the screen 30.

The above-described devices perform data communication with each other via a network such as a local area network (LAN). The data communication may be either wired or wireless. The data communication may also be performed via transmission cables, such as universal serial bus (USB) cables, as another example.

Figure 27:
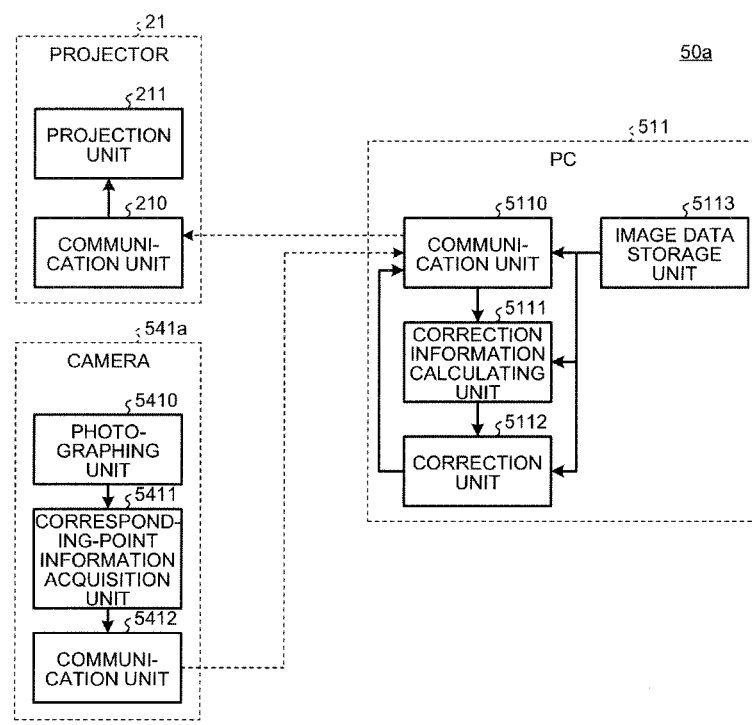
FIG. 27 is a diagram illustrating a configuration example of an image processing function according to the seventh embodiment.

A configuration and an operation of an image processing function according to the present embodiment will be described below. FIG. 27 is a diagram illustrating a configuration example of the image processing function according to the present embodiment.

As illustrated in FIG. 27, the image processing function according to the present embodiment is divided into functions included in the devices, that is, the PC 511, the projector 21, and the camera 541*a*. Specifically, the camera 541*a* according to the present embodiment includes functional units such as a communication unit 5412, a photographing unit 5410, and a corresponding-point information acquisition unit 5411. The PC 511 according to the present embodiment includes functional units such as a communication unit 5110, a correction information calculating unit 5111, and a correction unit 5112. The projector 21 according to the present embodiment includes functional units such as the communication unit 210 and the projection unit 211. The functional units included in the devices will be described below in accordance with flows of data sent and received between the devices.

The communication unit 5412 sends and receives data between the camera 541*a* and the PC 511. The communication unit 5412 controls drive of a communication interface (not illustrated) to perform data communication between the devices. The photographing unit 5410 takes a photograph by receiving light to obtain the photographed image. The photographing unit 5410 controls drive of a photographing device (not illustrated) to obtain the photographed image.

The corresponding-point information acquisition unit 5411 acquires the corresponding-point information of the projection image from the photographed image taken by the photographing unit 5410. The corresponding-point information refers to the position information of the corresponding point of the photographed image that corresponds to the feature point of the projection image. For example, when the projection image is a grid-point image, a grid point corresponds to the feature point of the projection image. Therefore, in this case, the corresponding-point information acquisition unit 5411 compares the projection image with the photographed image to extract, as the corresponding point, a grid point in the photographed image obtained by taking a photograph of the projection image, and obtains coordinate values of the extracted grid point as the corresponding-point information. Note that, when having extracted a plurality of such corresponding points, the corresponding-point information acquisition unit 5411 obtains corresponding-point information including a plurality of sets of coordinate values. The corresponding-point information acquisition unit 5411 uses a particular extraction method (hereinafter called extraction algorithm) to obtain the corresponding-point information. As the extraction method, for example, the scale-invariant feature transform (SIFT) method or a speed-up robust features (SURF) method is used at this time. The corresponding-point information acquisition unit 5411 sends the thus obtained corresponding-point information to the PC 511 via the communication unit 5412.

The communication unit 5110 sends and receives data between the projector 21 and the camera 541*a*. The communication unit 5110 controls drive of a communication interface (not illustrated) to perform the data communication between the devices.

Based on the corresponding-point information received from the camera 541*a* via the communication unit 5110, the correction information calculating unit 5111 calculates the correction information to correct the distortion of the projection image on the screen 30. The correction information calculating unit 5111 first obtains feature point information using the extraction algorithm such as the SIFT or the SURF. The feature point information includes the coordinate values of the feature point of the projection image (feature point of the image for correction information calculation). The received corresponding-point information includes the coordinate values of the corresponding point of the photographed image corresponding to the feature point of the projection image (corresponding point corresponding to the feature point of the image for correction information calculation). Consequently, based on the coordinate values of the feature point and the coordinate values of the corresponding point, the correction information calculating unit 5111 detects the relative positional relation between the feature point and the corresponding point so as to detect the degree of distortion due to the positional deviation between the feature point and the corresponding point. Based on the detected positional relation, the correction information calculating unit 5111 calculates the moving amounts (correction amounts) of the coordinates so as to eliminate the detected distortion.

Based on the correction information calculated by the correction information calculating unit 5111, the correction unit 5112 corrects the content image to be projected. The correction unit 5112 moves the coordinates in the content image according to the moving amounts of the coordinates included in the correction information, so as to perform the image correction to eliminate the distortion. The correction unit 5112 sends the corrected image thus corrected (corrected content image) to the projector 21 via the communication unit 5110.

The PC 511 also includes an image data storage unit 5113 that stores therein data such as the content image to be projected and the pattern image corresponding to the image for correction information calculation. The image data storage unit 5113 corresponds to the particular storage area of the storage device provided in the PC 511. Therefore, the correction information calculating unit 5111 accesses the image data storage unit 5113 to refer to the pattern image, and obtains the feature point information of the projection image from the pattern image referred to. The correction unit 5112 also accesses the image data storage unit 5113 to refer to the content image, and, after correcting the content image thus referred to, sends it to the projector 21. The communication unit 5110 also accesses the image data storage unit 5113 to obtain the pattern image, and sends the obtained pattern image to the projector 21.

While the present embodiment has illustrated the configuration example in which the PC 511 stores therein the content image and the pattern image, the present invention is not limited to this example. For example, the projector 21 or the camera 541a may be configured to store therein the content image and the pattern image. Moreover, the content image is not limited to an image stored in the PC 511, the projector 21, or the camera 541a, but may be an image stored in a device other than these devices.

The communication unit 210 sends and receives data between the projector 21 and the PC 511. The communication unit 210 controls drive of a communication interface (not illustrated) to perform data communication between the devices. The projection unit 211 uses light emitted by a light source to project the images onto the screen 30 via an optical lens. The projection unit 211 controls drive of a projecting device (not illustrated) to project the images. The projection unit 211 projects the corrected image received from the PC 511 via the communication unit 210 onto the screen 30.

As described above, an image processing program is executed in the devices, that is, the PC 511, the projector 21, and the camera 541a, and thus the above-described functional units perform cooperative operations, so that the image processing function according to the present embodiment is achieved.

The image processing program according to the present embodiment is provided by being recorded as a file in an installable format or an executable format in an external storage device including a recording medium readable by the devices (computers) providing execution environments. The image processing program has a module configuration including the above-described functional units, and a CPU provided in each of the devices reads the program from the external storage device and executes the program to generate the functional units in a RAM. The image processing program is not necessarily to be provided with this method. The image processing program may be provided, for example, by being stored in a device connected to the Internet or the like and downloaded via the network through the communication interface. The image processing program may also be provided by being embedded in advance in a ROM or the like.

While the above description has been made of the example in which the execution of the image processing/recognition program (software) achieves the image processing function according to the present embodiment, the present invention is not limited to this example. For example, some or all of the above-described functional units may be implemented by implementation of hardware logics (such as circuits).

Figure 28:
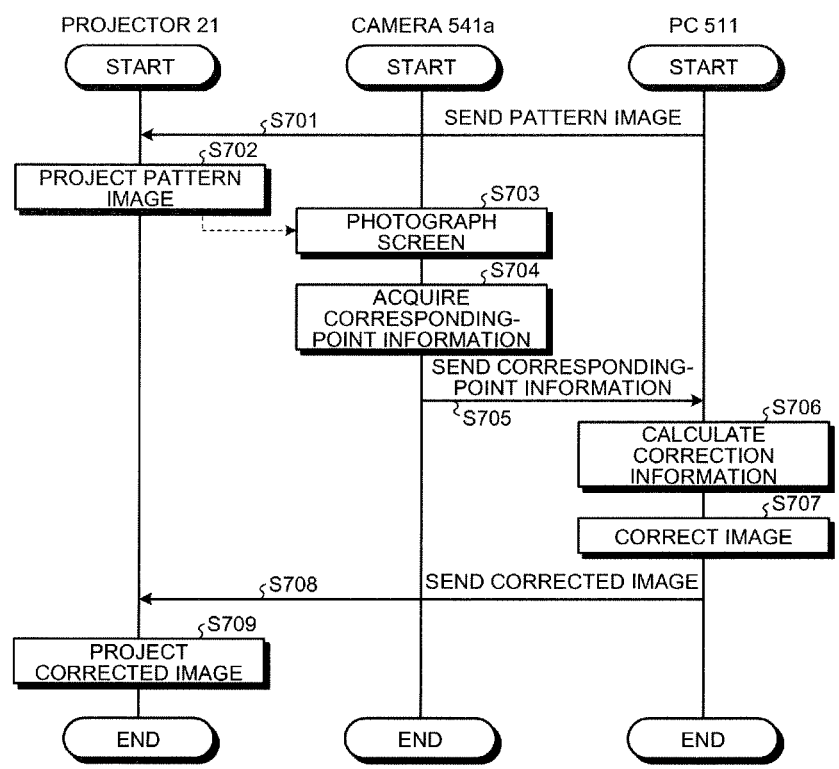
FIG. 28 is a sequence diagram illustrating an example of process procedures during image processing according to the seventh embodiment.

A description will be made below, using a sequence diagram, of the operation (cooperative operations of the functional units) during the execution of the image processing program according to the present embodiment. FIG. 28 is the sequence diagram illustrating an example of process procedures during the image processing according to the present embodiment.

First, as illustrated in FIG. 28, the PC 511 sends the pattern image corresponding to the image for correction information calculation to the projector 21 (Step S701).

After receiving the pattern image from the PC 511 via the communication unit 210, the projector 21 projects the received pattern image onto the screen 30 using the projection unit 211 (Step S702).

The camera 541a takes a photograph of the screen 30 using the photographing unit 5410 (Step S703) to obtain an area including the projection image projected on the screen 30 as the photographed image. Next, the camera 541a uses the corresponding-point information acquisition unit 5411 to acquire the corresponding-point information of the projection image from the photographed image (Step S704). At this time, the corresponding-point information acquisition unit 5411 uses a particular extraction algorithm to acquire the corresponding-point information of the projection image. Then, the camera 541a sends the corresponding-point information to the PC 511 via the communication unit 5412 (Step S705).

After receiving the corresponding-point information from the camera 541a via the communication unit 5110, the PC 511 uses the correction information calculating unit 5111 to calculate the correction information to correct the distortion of the projection image on the screen 30 based on the received corresponding-point information (Step S706). At this time, the correction information calculating unit 5111 uses a particular extraction algorithm to obtain the feature point information of the projection image. Based on the obtained feature point information and the received corresponding-point information, the correction information calculating unit 5111 detects the relative positional relation between the feature point and the corresponding point. Based on the detected positional relation, the correction information calculating unit 5111 calculates the correction information to eliminate the detected distortion. Then, based on the correction information, the PC 511 uses the correction unit 5112 to correct the content image to be projected (Step S707). Then, the PC 511 sends the corrected image to the projector 21 via the communication unit 5110 (Step S708).

After receiving the corrected image from the PC 511 via the communication unit 210, the projector 21 projects the received corrected image onto the screen 30 using the projection unit 211 (Step S709).

In this manner, in the image processing function according to the present embodiment, the corresponding-point information is sent to the PC 511 that calculates the correction information and corrects the distortion, and no image data except the corrected image is sent or received between the devices. As a result, in the image processing function according to the present embodiment, the data volume sent and received between the devices during the distortion correction can be reduced, and thus, the time required for the sending and receiving operations can be shortened. In the image processing function according to the present embodiment, the correction information to correct the distortion of the projection image on the screen 30 is calculated based on the corresponding-point information of the projection image acquired from the photographed image, and the content image to be projected is corrected based on the correction information. As a result, in the image processing function according to the present embodiment, the distortion correction can be performed using the photographed image having an appropriate amount of information without a reduction in the data volume of the image, and thus, a high correction accuracy level can be maintained.

As described above, in the image processing system 50*a* according to the present embodiment, the camera 541*a* acquires the corresponding-point information of the projection image from the photographed image taken by the camera 541*a*, and sends the acquired corresponding-point information to the PC 511. This leads the PC 511 to calculate, based on the received corresponding-point information, the correction information to correct the distortion of the projection image on the screen 30. Then, based on the calculated correction information, the PC 511 corrects the content image to be projected, and sends the corrected image thus corrected to the projector 21. This leads the projector 21 to project the received corrected image onto the screen 30.

Hereby, the image processing system 50*a* according to the present embodiment provides an environment in which the data volume sent and received between the devices during the distortion correction is reduced, and thus the time required for the sending and receiving is shortened. The image processing system 50*a* according to the present embodiment also provides an environment in which the distortion correction is performed using the photographed image having an appropriate amount of information, and thus a high correction accuracy level is maintained. As a result, the image processing system 50*a* according to the present embodiment can maintain a high correction accuracy level and can speed up the processing.

In the embodiment described above, an example has been illustrated in which, when sending the corresponding-point information to the PC 511, the camera 541*a* sends the obtained data as it is. However, the present invention is not limited to this example. The camera 541*a* may, for example, compress the corresponding-point information and then send it to the PC 511. In this case, compared with the case of sending the obtained data as it is, the data sent from the camera 541*a* to the PC 511 is smaller in data volume, and thus, the processing time required for sending and receiving can be shorter.

Furthermore, in the embodiment described above, an example has been illustrated in which, in the calculation of the correction information, the feature point information of the projected image formed by projecting the image for correction information calculation is obtained. However, the embodiment is not limited to this example. For example, the PC 511 may store therein in advance the feature point information of the image for correction information calculation. This results in fewer steps in the process procedures than in the case of obtaining the feature point information of the projected image, and thus can shorten the processing time required for the distortion correction.

Eighth Embodiment

In an eighth embodiment, a camera 541*b* calculates, based on the corresponding-point information of the projection image acquired from the photographed image, the correction information to correct the distortion of the projection image on the screen 30. Then, based on the calculated correction information, the camera 541*b* corrects the content image to be projected, and sends the corrected image thus corrected to the projector 21. Hereby, the present embodiment provides an environment in which the data volume sent and received between the devices during the distortion correction is reduced, and thus the time required for the sending and receiving is shortened. The present embodiment also provides an environment in which the distortion correction is performed using the photographed image having an appropriate amount of information, and thus a high correction accuracy level is maintained. Note that the present embodiment will be described regarding items different from those of the first embodiment, and the same items will be omitted from the description.

Figure 29:
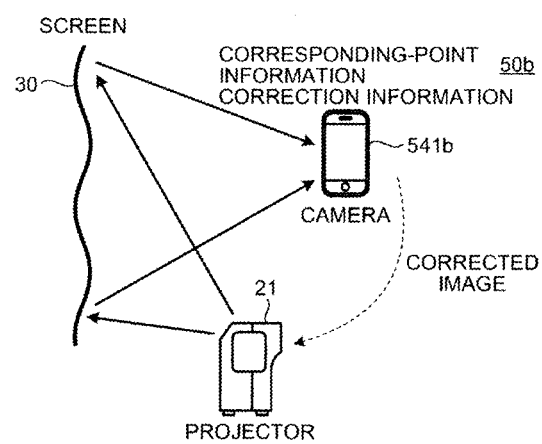
FIG. 29 is a diagram illustrating a configuration example of an image processing system according to an eighth embodiment.

FIG. 29 is a diagram illustrating a configuration example of an image processing system 50*b* according to the present embodiment. As illustrated in FIG. 29, the image processing system 50*b* according to the present embodiment is provided with the projector 21 and the camera 541*b*. The devices, that is, the projector 21 and the camera 541*b* are connected to each other via a particular data transmission path. This allows the devices to communicate various data between each other.

The intended use for the image processing system 50*b* according to the present embodiment is to project a content image to be projected that is stored in an external device onto the screen 30. Thus, the image processing system 50*b* according to the present embodiment can also project the content image provided by a device other than a PC onto the screen 30.

The image processing system 50*b* according to the present embodiment uses the following operations performed by the respective devices to correct the distortion produced in the projection image, and to project the image without distortion onto the screen 30. First, the camera 541*b* acquires, from the photographed image taken thereby, the corresponding-point information of the projection image, and, based on the acquired corresponding-point information, calculates the correction information to correct the distortion of the projection image on the screen 30. Next, based on the calculated correction information, the camera 541*b* corrects the content image to be projected, and sends the corrected image thus corrected to the projector 21. This leads the projector 21 to project the received corrected image onto the screen 30. As a result, the image processing system 50*b* according to the present embodiment projects the image without distortion on the screen 30.

Figure 30:
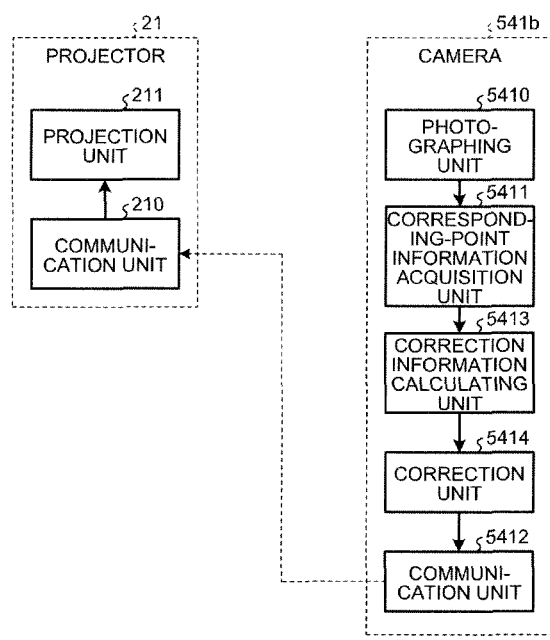
FIG. 30 is a diagram illustrating a configuration example of an image processing function according to the eighth embodiment.

A configuration and an operation of an image processing function according to the present embodiment will be described below. FIG. 30 is a diagram illustrating a configuration example of the image processing function according to the present embodiment.

As illustrated in FIG. 30, the image processing function according to the present embodiment is divided into functions included in the devices, that is, the projector 21 and the camera 541*b*. Specifically, the camera 541*b* according to the present embodiment includes functional units such as the communication unit 5412, the photographing unit 5410, the corresponding-point information acquisition unit 5411, a correction information calculating unit 5413, and a correction unit 5414. The projector 21 according to the present embodiment includes functional units such as the communication unit 210 and the projection unit 211. The functional units included in the devices will be described below in accordance with flows of data sent and received between the devices.

The communication unit 5412 sends and receives data between the camera 541*b* and the projector 21. The corresponding-point information acquisition unit 5411 acquires the corresponding-point information of the projection image from the photographed image taken by the photographing unit 5410. Based on the corresponding-point information acquired by the corresponding-point information acquisition unit 5411, the correction information calculating unit 5413 calculates the correction information to correct the distortion of the projection image on the screen 30. Based on the correction information calculated by the correction information calculating unit 5413, the correction unit 5414 corrects the content image to be projected. The correction unit 5414 sends the corrected image thus corrected to the projector 21 via the communication unit 5412.

The communication unit 210 sends and receives data between the projector 21 and the camera 541b. The projection unit 211 projects the corrected image received from the camera 541b via the communication unit 210 onto the screen 30.

As described above, the above-described functional units perform cooperative operations in the devices, that is, the projector 21 and the camera 541b, so that the image processing function according to the present embodiment is achieved.

Figure 31:
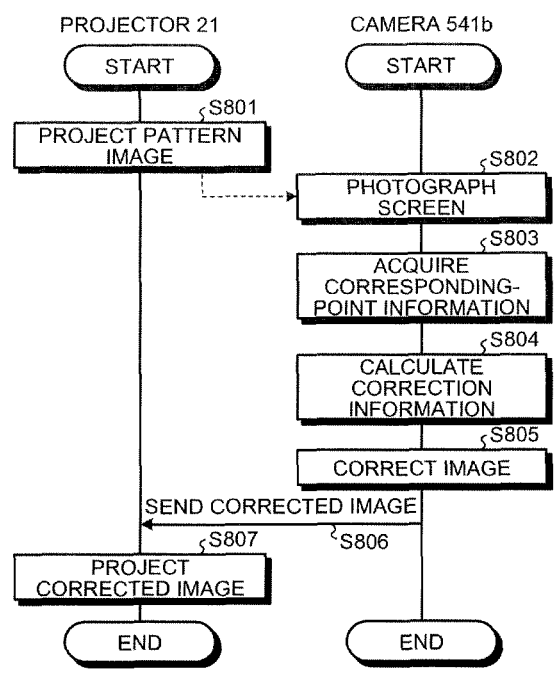
FIG. 31 is a sequence diagram illustrating an example of process procedures during image processing according to the eighth embodiment.

A description will be made below, using a sequence diagram, of the operation (cooperative operations of the functional units) during the execution of the image processing function according to the present embodiment. FIG. 31 is the sequence diagram illustrating an example of process procedures during the image processing according to the present embodiment. FIG. 31 illustrates the operation after the external device has provided the content image to be projected to the projector 21 and the camera 541b.

First, as illustrated in FIG. 31, the projector 21 projects a pattern image corresponding to the image for correction information calculation onto the screen 30 using the projection unit 211 (Step S801). Note that the pattern image projected at this time is stored in advance in a particular storage area of a storage device provided in the projector 21.

The camera 541b takes a photograph of the screen 30 using the photographing unit 5410 (Step S802) to obtain an area including the projection image projected on the screen 30 as the photographed image. Next, the camera 541b uses the corresponding-point information acquisition unit 5411 to acquire the corresponding-point information of the projection image from the photographed image (Step S803). Then, based on the corresponding-point information, the camera 541b uses the correction information calculating unit 5413 to calculate the correction information to correct the distortion of the projection image on the screen 30 (Step S804). Then, based on the correction information, the camera 541b uses the correction unit 5414 to correct the content image to be projected (Step S805). Then, the camera 541b sends the corrected image to the projector 21 via the communication unit 5412 (Step S806).

After receiving the corrected image from the camera 541b via the communication unit 210, the projector 21 projects the received corrected image onto the screen 30 using the projection unit 211 (Step S807).

In this manner, in the image processing function according to the present embodiment, the camera 541b performs the calculation of the correction information, the distortion correction, and the sending of the corrected image to the projector 21, and no image data except the corrected image is sent or received between the devices. As a result, in the image processing function according to the present embodiment, the data volume sent and received between the devices during the distortion correction can be reduced, and thus, the time required for the sending and receiving processes can be shortened. In the image processing function according to the present embodiment, the correction information to correct the distortion of the projection image on the screen 30 is calculated based on the corresponding-point information of the projection image acquired from the photographed image, and the content image to be projected is corrected based on the correction information. As a result, in the image processing function according to the present embodiment, the distortion correction can be performed using the photographed image having an appropriate amount of information without a reduction in the data volume of the image, and thus, a high correction accuracy level can be maintained.

As described above, with the image processing system 50b according to the present embodiment, the camera 541b acquires the corresponding-point information of the projection image from the photographed image taken by the camera 541b, and, based on the acquired corresponding-point information, calculates the correction information to correct the distortion of the projection image on the screen 30. Then, based on the calculated correction information, the camera 541b corrects the content image to be projected, and sends the corrected image thus corrected to the projector 21. This leads the projector 21 to project the received corrected image onto the screen 30.

Hereby, the image processing system 50b according to the present embodiment provides an environment in which the data volume sent and received between the devices during the distortion correction is reduced, and thus the time required for the sending and receiving is shortened. The image processing system 50b according to the present embodiment also provides an environment in which the distortion correction is performed using the photographed image having an appropriate amount of information, and thus a high correction accuracy level is maintained. As a result, the image processing system 50b according to the present embodiment can maintain a high correction accuracy level and can speed up the processing.

In the image processing system 50b according to the present embodiment, the camera 541b retains the correction information, and therefore, the distortion need not be detected again with replacement of the projector 21 projecting the content image or the external device providing the content image.

In the image processing system 50b according to the present embodiment, the camera 541b performs the operation from the calculation of the correction information to the distortion correction, and therefore, an image without distortion is projected on the screen 30 only by providing the content image to be projected from the external device to the projector 21 and the camera 541b.

The image processing system 50b according to the present embodiment establishes the environment of allowing the projector 21 and the camera 541b to perform the image processing for correcting the distortion, and therefore, the system configuration can be simplified.

Each of the projector, the PC, the camera, and a calculating device of the present embodiment is provided with a control device such as a CPU, storage devices including a read-only memory (ROM) and a RAM, external storage devices including an HDD and a CD drive device, a display device such as a display monitor, and an input device including a keyboard and a mouse, and has a hardware configuration using an ordinary computer.

A program executed in the projector, the PC, the camera, and the calculating device of the present embodiment is provided by being recorded, as a file in an installable format or an executable format, in a computer-readable recording medium, such as a CD-ROM, a flexible disk (ED), a CD-R, or a digital versatile disc (DVD).

The program executed in the projector, the PC, the camera, and the calculating device of the present embodiment may be configured to be provided by being stored in a computer connected to a network such as the Internet and downloaded via the network. The program executed in the projector, the PC, the camera, and the calculating device of the present embodiment may also be configured to be provided or distributed via a network such as the Internet. The program of the present embodiment may also be configured to be provided by being embedded in advance in a ROM or the like.

The program executed in the projector, the PC, the camera, and the calculating device of the present embodiment has a module configuration including the above-described units. In the actual hardware, the CPU (processor) reads and executes the program from the above-mentioned recording medium, so that the units are loaded into the main memory and generated in the main memory.

According to the present invention, a distortion of an image projected onto a screen can be corrected with a small amount of calculation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
   a projection unit that projects onto a projection surface an image including at least one of a first content image and a pattern image that is configured for calibrating the projection unit;
   a mobile device including:
     a communication unit to receive the pattern image from the projection unit before the pattern image is projected onto the projection surface;
     a photographing unit that takes a photograph of an area including the projection surface onto which the pattern image is projected by the projection unit, so as to obtain a first photographed image;
     a data volume reducing unit configured to reduce a data volume of the first photographed image through a predetermined processing, to obtain a second photographed image after data volume reduction;
     a correction information calculating unit configured to calculate, based on the pattern image and the second photographed image, correction information for correcting an image to be projected onto the projection surface after the mobile device receives the pattern image from the projection unit; and
     a correction unit configured to correct, based on the correction information, the first content image to obtain a second content image that is the image to be projected onto the projection surface,
   wherein the projection unit projects the corrected second content image onto the projection surface.

2. The image processing system according to claim 1, wherein the first content image and the second content image are the same image.

3. The image processing system according to claim 1, wherein the first content image and the second content image are different images.

4. The image processing system according to claim 1, wherein the data volume reducing unit obtains the second photographed image by applying, to the first photographed image, at least one type of processing selected from a scaling processing of reducing a magnification ratio of the first photographed image by a certain amount, a color reduction processing of reducing number of colors included in the first photographed image by a certain amount, and a compression processing of compressing the first photographed image to a particular ratio.

5. The image processing system according to claim 1, wherein the photographing unit is a portable device carried by a user and includes:
   a gravitational direction determination unit configured to determine the direction of gravity of the photographing unit at the time when the photographing unit is taking a photograph; and
   a vertical direction changing unit configured to change the vertical direction of the first photographed image based on the direction of gravity, and
   the data volume reducing unit reduces the data volume of the first photographed image after the vertical direction is changed.

6. The image processing system according to claim 1, wherein the photographing unit is a portable device carried by a user and includes:
   a gravitational direction determination unit configured to determine the direction of gravity of the photographing unit at the time when the photographing unit is taking a photograph; and
   a vertical direction changing unit configured to change the vertical direction of the second photographed image based on the direction of gravity, and
   the correction information calculating unit calculates the correction information based on the second photographed image after the vertical direction is changed and based on the first content image.

7. The image processing system according to claim 1, wherein the image processing system includes a first device, a second device, and a third device, the first device includes the projection unit,
   the second device includes:
     the photographing unit;
     the data volume reducing unit; and
     a sending unit configured to send the second photographed image to the third device,
   the third device includes:
     a receiving unit configured to receive the second photographed image from the second device;
     the correction information calculating unit;
     the correction unit; and
     a sending unit configured to send the corrected second content image to the first device, and
   the first device further includes a receiving unit configured to receive the corrected second content image from the third device.

8. The image processing system according to claim 7, wherein the photographing unit is a portable device carried by a user, the second device further includes:
   a gravitational direction determination unit configured to determine the direction of gravity of the second device at the time when the photographing unit is taking a photograph; and
   a vertical direction changing unit configured to change the vertical direction of the first photographed image based on the direction of gravity, and
   the data volume reducing unit reduces the data volume of the first photographed image after the vertical direction is changed.

9. The image processing system according to claim 7, wherein the second device is a portable device carried by a user, the second device further includes:
   a gravitational direction determination unit configured to determine the direction of gravity of the second device at the time when the photographing unit is taking a photograph; and
   a vertical direction changing unit configured to change the vertical direction of the second photographed image based on the direction of gravity; and the correction information calculating unit calculates the correction information based on the second photographed image after the vertical direction is changed.

10. The image processing system according to claim 7, wherein
the second device is a portable device carried by a user,
the second device further includes a gravitational direction determination unit configured to determine the direction of gravity of the second device at the time when the photographing unit is taking a photograph,
the sending unit sends, to the third device, the second photographed image and gravitational direction information that indicates the direction of gravity,
the third device further includes a vertical direction changing unit configured to change the vertical direction of the second photographed image based on the direction of gravity, and
the correction information calculating unit calculates the correction information based on the second photographed image after the vertical direction is changed.

11. The image processing system according to claim 1, wherein
the image processing system includes a first device, a second device, and a third device,
the first device includes the projection unit;
the second device includes:
the photographing unit;
the data volume reducing unit; and
a sending unit configured to send the second photographed image to the first device,
the first device further includes:
a receiving unit configured to receive the second photographed image from the second device;
the correction information calculating unit; and
a sending unit configured to send the correction information to the third device, and the third device includes:
a receiving unit configured to receive the correction information from the first device;
the correction unit; and
a sending unit configured to send the corrected second content image to the first device.

12. The image processing system according to claim 1, wherein
the image processing system includes a first device, a second device, and a third device,
the first device includes the projection unit,
the second device includes:
the photographing unit;
the data volume reducing unit; and
a sending unit configured to send the second photographed image to the first device, and
the first device further includes:
a receiving unit configured to receive the second photographed image from the second device;
the correction information calculating unit; and
the correction unit.

13. The image processing system according to claim 1, wherein
the image processing system includes a first device and a second device,
the first device includes the projection unit,
the second device includes:
the photographing unit;
the data volume reducing unit;
the correction information calculating unit;
the correction unit; and
a sending unit configured to send the corrected second content image to the first device, and
the first device further includes a receiving unit configured to receive the corrected second content image from the second device.

14. An image processing method comprising:
causing a projection unit to transmit a pattern image for calibrating the projection unit to a mobile device before the projection unit projects the pattern image onto a projection surface;
causing a photograph to be taken of an area including the projection surface onto which the pattern image is projected, so as to obtain a first photographed image, reducing a data volume of the first photographed image through a predetermined processing, to obtain a second photographed image after data volume reduction, calculating, based on the pattern image and the second photographed image, correction information for correcting a first content image to be projected onto the projection surface after receiving the pattern image from the projection unit, correcting, by the mobile device and based on the correction information, the first content image to obtain a second content image that is the image to be projected onto the projection surface; and
projecting the corrected second content image onto the projection surface.

15. A computer program product comprising a non-transitory computer-readable medium containing a computer program that causes a computer to execute:
causing a projection unit to transmit a pattern image for calibrating the projection unit to a mobile device before the projection unit projects the pattern image onto a projection surface;
taking a photograph of an area including the projection surface onto which the pattern image is projected, so as to obtain a first photographed image,
reducing a data volume of the first photographed image through a predetermined processing, to obtain a second photographed image after data volume reduction;
calculating, based on the pattern image and the second photographed image, correction information for correcting a first content image to be projected onto the projection surface after receiving the pattern image from the projection unit; and
correcting, based on the correction information, the first content image to obtain a second content image that is the image to be projected onto the projection surface.

* * * * *